United States Patent
Hirai

(10) Patent No.: US 7,390,254 B2
(45) Date of Patent: *Jun. 24, 2008

(54) SOCCER GAME METHOD FOR USE IN GAME APPARATUS, INVOLVES RECOGNIZING AREAS PERTAINING TO POWER OF CHARACTER GROUP, BASED ON CALCULATED ARRIVAL TIMES OF CHARACTERS UP TO SAMPLE POINTS

(75) Inventor: Yoshiaki Hirai, Ohta-ku (JP)

(73) Assignee: Namco Bandai Games Inc., Tokyo (JP)

( * ) Notice: Subject to any disclaimer, the term of this patent is extended or adjusted under 35 U.S.C. 154(b) by 599 days.

This patent is subject to a terminal disclaimer.

(21) Appl. No.: 10/825,375

(22) Filed: Apr. 16, 2004

(65) Prior Publication Data

US 2004/0248631 A1 Dec. 9, 2004

(30) Foreign Application Priority Data

Apr. 25, 2003 (JP) .............................. 2003-122769

(51) Int. Cl.
*A63F 13/00* (2006.01)

(52) U.S. Cl. ................................ 463/4; 463/31; 463/43

(58) Field of Classification Search ...................... 463/4, 463/30, 31, 43, 44
See application file for complete search history.

(56) References Cited

U.S. PATENT DOCUMENTS 3,874,669 A * 4/1975 Ariano et al. ................... 463/4
5,636,920 A * 6/1997 Shur et al. ..................... 700/91
5,735,743 A * 4/1998 Murata et al. ................... 463/4
6,149,520 A * 11/2000 Takatsuka ....................... 463/4

(Continued)

FOREIGN PATENT DOCUMENTS

JP  A 2002-325964   11/2002

(Continued)

OTHER PUBLICATIONS

Tsuyoshi Taki & Jun-Ichi Hasegawa, "A Feature for Group Behavior Analysis in Team Sports and its Application," *The Transactions of the Institute of Electronics, Information and Communication Engineers D-II*, vol. J81-D-II No. 8, The Institute of Electronics, Information and Communication Engineers, p. 1802-1811, Aug. 25, 1998.

(Continued)

*Primary Examiner*—Ronald Laneau
*Assistant Examiner*—Victor Cheung
(74) *Attorney, Agent, or Firm*—Oliff & Berridge, PLC

(57) ABSTRACT

A game executing method for making a computer device execute a given game by generating an image of a game space, and for analyzing and outputting a power distribution of a character group in the game space, the character group including a plurality of characters movable in the game space. The method includes setting a plurality of sample points in the game space; calculating a position of each character at a time that each character has maintained a current moving condition for a predetermined time period; calculating an arrival time needed for each character to arrive at each set sample point from the calculated position as a starting point; calculating the power distribution of the character group based on the calculated arrival time of each character to each sample point; and outputting a geographical power state of the game space based on the calculated power distribution according to a predetermined output method.

14 Claims, 24 Drawing Sheets

U.S. PATENT DOCUMENTS

| | | | |
|---|---|---|---|
| 6,152,821 A * | 11/2000 | Nakagawa et al. | 463/4 |
| 6,503,144 B1 * | 1/2003 | Rimoto et al. | 463/4 |
| 6,558,258 B1 * | 5/2003 | Rupert et al. | 463/33 |

FOREIGN PATENT DOCUMENTS

WO    WO 02/095688 A1    11/2002

OTHER PUBLICATIONS

Tsuyoshi Taki & Jun-Ichi Hasegawa, "A Team Sports Analysis based on Dominant Region," *Information Processing*, vol. 42, No. 6, p. 582-586 Information Processing Society of Japan, Jun. 15, 2001.

Norifumi Ochimachi & George Lashkia, "Soccer Game Analyzer Support System," *Collected Papers of the 65th National Convention (2) Artificial Intelligence and Cognitive Science*, p. 2-259~2-260, Information Processing Society of Japan, Mar. 25, 2003.

Satoshi Hisamoto & V. Lashkia, "Soccer Game Scene Analyzer Support System" *The Institute of Electrical Engineers of Japan, Technical Committee Report IIS-0013~21, Technical Committee of Information Oriented Industrial System*, p. 9-13, The Institute of Electrical Engineers of Japan, Aug. 10, 2000.

* cited by examiner

ARRIVAL TIME $T = \overline{PQ} / Va$

FIG.9

| ATHLETE CHARACTER INFORMATION | | 732 |
|---|---|---|
| 732a | PLAYER IDENTIFICATION INFORMATION | KOBUTA MAN |
| 732b | AFFILIATED TEAM IDENTIFICATION INFORMATION | PLAYER |
| 732c | BEHAVIOR TYPE | DRIBBLING |
| 732d | POSITION COORDINATE | (x11,y11,z11) |
| 732e | SPEED | Vn(Vx11,0,Vz11) |
| 732f | ABILITY SPEED | 2.0 (m/s) |
| 732g | OBJECT DATA | |

| AREA REGISTRATION TBL | | | | |
|---|---|---|---|---|
| AREA IDENTIFICATION INFORMATION | AR11 | AR12 | AR13 | |
| 733a REPRESENTATIVE POINT COORDINATE | (X11,Z11) | (X12,Z12) | (X13,Z13) | |
| 733b MINIMUM ARRIVAL TIME | 3.2sec | 5.2sec | 10sec | |
| 733c PLAYER IDENTIFICATION INFORMATION | KOBUTA MAN | ENEMY01 | 0 | |
| 733e PREDOMINANT TEAM IDENTIFICATION INFORMATION | PLAYER | COM | 0 | |
| 733f SPACE ESTIMATION POINT | 1.8 | -0.2 | -5 | |

LIVE SOUND DATA TBL 735

| SELECTION CONDITION | LIVE SOUND DATA |
|---|---|
| SPACE LIVE OUTPUT | "OH, SPACE IS MADE AT (APPELLATION)" |
|  | "NOW, THEY BETTER USE (APPELLATION) SPACE!" |
|  | "COVER OF (APPELLATION) SPACE IS DELAYED" |
| ⋮ | ⋮ |

APPELLATION TBL 736

| COORDINATE RANGE | APPELLATION SOUND DATA |
|---|---|
| $(Xa1, Za1) - (Xa2, Za2)$ | "RIGHT FRONT SIDE" |
| $(Xb1, Zb1) - (Xb2, Zb2)$ | "LEFT HALF SIDE" |
| ⋮ | ⋮ |

ATTACK DIRECTION OF PLAYER TEAM

ATTACK DIRECTION OF PLAYER TEAM

737 AREA REGISTRATION TBL

| | | | | |
|---|---|---|---|---|
| 733a AREA IDENTIFICATION INFORMATION | AR11 | AR12 | AR13 | |
| 733b REPRESENTATIVE POINT COORDINATE | (X11,Z11) | (X12,Z12) | (X13,Z13) | |
| 737g PLAYER POWER POINT | 2 | 1 | 0 | |
| 737h COM POWER POINT | 0 | 0 | 0 | |

SOCCER GAME METHOD FOR USE IN GAME APPARATUS, INVOLVES RECOGNIZING AREAS PERTAINING TO POWER OF CHARACTER GROUP, BASED ON CALCULATED ARRIVAL TIMES OF CHARACTERS UP TO SAMPLE POINTS

BACKGROUND OF THE INVENTION

1. Field of the Invention

The present invention relates to a game executing method, an information recording medium, a game device, a data signal and a program for making a computer device execute a given game by generating an image of a game space and for analyzing and outputting a power distribution in the game space of a character group comprising a plurality of characters movable in the game space.

2. Description of Related Art

A soccer game is known as one genre of video games. A game playing person can enjoy a soccer game under virtual reality while one team is set as an game playing person's team operated by the game playing person and the other team is set as a COM team automatically operated by a computer.

For example, there is known such a soccer game that a shout of a player can be output with voice to achieve more realistic sensations like an actual game and to enable the player to have good cooperation with another player (for example, see Japanese Patent Application Publication (Unexamined) No. Tokukai 2002-325964).

Specifically, when a teammate of a player character operated by a game playing person keeps a ball, position information of all the fellow players and rival players at that time is obtained, and the distance and direction between the player character and each of the other players are detected on the basis of the position information. Players existing within a predetermined area from the player character are identified, and it is judged whether the identified player is a teammate or not. If the identified player is a teammate, voice of shouts is output with the contents and voice levels corresponding to the direction to the player. If he/she is not a teammate, an effect sound is output instead of a shout voice.

"Space" is considered as an element for strategy in a real soccer. "Space" means an "vacant space" in which neither a teammate nor a rival player exists in a pitch which is equivalent to a soccer court, and it is an available area into which an attacking-side team player passes a ball or runs and which is thinly marked by the other team.

In a real soccer, it is strategically important how to find out and effectively use such a space while a ball is passed around. For example, the following tactical pattern is known as one of tactical patterns for attacking from the midfield. That is, when a space exists at a rival team goal side, a player kicks the ball into the space and at the same time another player runs to the space to receive the ball. Furthermore, the player passes the ball to another player that is running to the center of the front side of the goal, and the running player receives the ball and shoots the ball.

The conventional soccer game is based on passing from a player to another player or shooting to a goal as a principle, and it is impossible to kick the ball to any area corresponding to a space. Furthermore, game playing persons are not provided any information concerning space. Therefore, the strategies in the real soccer as described above cannot be implemented to be enjoyed in a game.

If a game playing person knows a geographical distribution state of power in a game space, it would be expected that the game playing person can simply recognizes a player running to a space to enjoy the strategies as described above by carrying out an input operation so that the ball is passed to the player running to this space.

SUMMARY OF THE INVENTION

The present invention has been implemented in view of the foregoing problem, and has an object to output a geographical power state in a game space and informs a game playing person of the state.

In accordance with a first aspect of the present invention, a game executing method for making a computer device execute a given game by generating an image of a game space, and for analyzing and outputting a power distribution of a character group in the game space, the character group comprising a plurality of characters movable in the game space, comprises: setting a plurality of sample points in the game space; calculating a position of each of the plurality of characters at a time that each of the plurality of characters has maintained a current moving condition for a predetermined time period; calculating an arrival time needed for each of the plurality of characters to arrive at each of the set sample points from the calculated position as a starting point; calculating the power distribution of the character group based on the calculated arrival time of each of the plurality of characters to each of the plurality of sample points; and outputting a geographical power state of the game space based on the calculated power distribution according to a predetermined output method.

In accordance with a second aspect of the present invention, a game device for executing a predetermined game by generating an image of a game space, and for analyzing and outputting a power distribution of a character group in the game space, the character group comprising a plurality of characters movable in the game space, comprises: a point setting section for setting a plurality of sample points in the game space; an inertia calculating section for calculating a position of each of the plurality of characters at a time that each of the plurality of characters has maintained a current moving condition for a predetermined time period; an arrival time calculating section for calculating an arrival time needed for each of the plurality of characters to arrive at each of the plurality of set sample points from the calculated position as a starting point; a distribution calculating section for calculating the power distribution of the character group based on the calculated arrival time of each of the plurality of characters to each of the plurality of sample points; and an output section for outputting a geographical power state of the game space based on the calculated power distribution according to a predetermined output method.

According to the method of the first aspect and the device of the second aspect of the present invention, a power distribution can be calculated on the basis of an arrival time of each character to a plurality of sample points set in a game space and be output according to a predetermined method. For example, in the case of a soccer game, if a player can arrive at a certain place (sample point) earlier than rival team players, the player could receive the ball or keep the ball without being disturbed by the rival team players at the place, and thus a team of the player is judged as predominant. Accordingly, the power distribution in the game can be output to enable the game playing person to readily find an area where the players of the game playing person's team (predominant team) can play predominantly.

With respect to the calculation of the arrival time, the arrival time into which the inertia of the motion of each character is incorporated can be calculated with a little calculation load without using no strict dynamic simulation for the character by calculating a virtual movement position after a predetermined time when the present moving condition of the character is maintained and calculating the arrival time from the calculated movement position to a sample point.

Preferably, in the method of the first aspect of the present invention, the calculating the arrival time includes calculating the arrival time from the starting point to each of the set sample points based on a movement ability value preset to each of the plurality of characters.

A movement ability value corresponds to parameters set to each character, and it corresponds to a parameter of the maximum speed of the character, parameters on agility and legerity, etc.

According to the above method, a more realistic power distribution can be determined by reflecting the personality of each character such as a running speed, agility, etc. in the calculation of the arrival time.

Preferably, the method of the first aspect of the present invention further comprises selecting a sample point within a predetermined distance from the calculated position as the starting point, among the set sample points, wherein calculating the arrival time includes calculating the arrival time of each of the plurality of characters from the calculated position to the selected sample point.

According to the above method, the sample point to calculate the arrival time can be limited. Accordingly, the calculation load for calculating the power distribution can be reduced, and the processing speed can be increased.

Preferably, the method of the first aspect of the present invention further comprises selecting a character of which the arrival time is to be calculated based on the distance from each of the plurality of set sample points to the calculated position, wherein calculating the arrival time includes calculating a time needed for the selected character to arrive at each of the plurality of set sample points.

According to the above method, the sample point to calculate the arrival time can be limited, and thus the calculation load for calculating the power distribution can be reduced, and the processing speed can be increased.

Preferably, the method of the first aspect of the present invention further comprises calculating a predominance degree for each of the plurality of set sample points; and calculating the predominance degree of each of the plurality of sample point so as to make the predominance degree higher as the arrival time of a character capable of arriving earliest is shorter, wherein calculating the power distribution includes calculating the power distribution based on the calculated predominance degree of each of the plurality of sample points.

According to the above method, the power distribution can be determined so that each sample point is set to a power range of a character which can arrive at the earliest time. Accordingly, a power distribution in a game in which characters move in a predetermined field to scramble for a ball or the like can be accurately determined.

Preferably, in the method of the first aspect of the present invention, the setting the plurality of sample points includes setting the plurality of sample points at least at a predetermined interval in the game space.

According to the above method, the processing load imposed on the calculation of the power distribution can be reduced and the processing speed can be increased by limiting the total number of sample points.

Preferably, in the method of the first aspect of the present invention, the setting the plurality of sample points includes sectioning the game space into at least two kinds of a plurality of areas that are different from each other in shape and/or size, and setting the plurality of sample points in the plurality of sectioned areas.

According to the above method, the power distribution for a specific range in the game space can be calculated and displayed with different minuteness from other ranges. For example, minutely segmented areas are set for a place where the characters are liable to be packed or a place which is important to the game, whereby the power distribution can be displayed with the minuteness corresponding to the necessity of each place and thus the utility of outputting the power distribution can be enhanced. When an area is set to be large, the processing load can be further reduced. Furthermore, an area can be output so as to have the shape corresponding to a geographical shape by changing the shape.

Preferably, in the method of the first aspect of the present invention, the character group includes a plurality of character groups, and the calculating the power distribution includes calculating the power distribution for each of the plurality of character groups based on the arrival time of each of the plurality of sample points.

According to the above method, the power distribution can be output for each type of character group.

More preferably, the calculating the power distribution includes calculating the power distribution for each of the plurality of character groups in accordance with a character group to which a character belongs, the character being capable of arriving earliest at each of the plurality of sample points.

Preferably, the method of the first aspect of the present invention further comprises storing the calculated power distribution, wherein the outputting the geographical power state includes outputting the stored power distribution.

According to the above method, a power distribution in the past can be reproduced and displayed.

Preferably, in the method of the first aspect of the present invention, the storing the power distribution includes judging whether the calculated power distribution satisfies a predetermined storing condition, and storing the calculated power distribution if the power distribution satisfies the predetermined storing condition.

According to the above method, a power distribution calculated by distribution calculating means only when the power distribution satisfies a predetermined storage condition can be stored.

Preferably, in the method of the first aspect of the present invention, the outputting the geographical power state includes identifiably displaying a non-power area of the character group as a space area on the image of the game space based on the calculated power distribution.

According to the above method, a non-power area which does not belong to the power of a character group can be displayed on a game screen. Accordingly, for example, in the case of a soccer game, the so-called "space" in which no player exists can be displayed.

Preferably, in the method of the first aspect of the present invention, the plurality of characters include a plurality of characters moving on a predetermined terrain, the setting the plurality of sample points includes setting the plurality of sample points on the terrain, the calculating the power distribution includes calculating the power distribution on the terrain, and the outputting the geographical power state includes identifiably displaying a portion of the space area on the terrain.

According to the above method, since a space area can be identifiably displayed on a terrain, the positional relationship between the position of each character and the space area can be more readily displayed.

Preferably, in the method of the first aspect of the present invention, the outputting the geographical power state includes controlling, based on the calculated power distribution, an output of a voice indicating a position of a space area corresponding to a non-power area of the character group and a voice indicating that the position of the space area is a space area.

According to the above method, the power distribution can be output with sound.

In accordance with a third aspect of the present invention, an information storage medium has information recorded thereon, when the information is loaded onto an operating apparatus, the information making the operating apparatus execute the method of the first aspect.

The information storage medium corresponds to various kinds of IC memories, CD-ROM, DVD, MO, a memory card, a memory cassette, a hard disc or the like. The device reads out game information from the information storage medium as described above and executes calculation processing, so that the same effect as the method according to the first aspect can be implemented.

In accordance with a fourth aspect of the present invention, a data signal is embodied in a carrier wave, comprises information used for executing the method of the first aspect.

In accordance with a fifth aspect of the present invention, a program, when the program is loaded onto an operating device, makes the operating device execute the method of the first aspect.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 9 is a diagram showing an example of player character information according to the first embodiment;

FIG. 10 is a diagram showing an example of an area registration TBL according to the first embodiment;

PREFERRED EMBODIMENTS OF THE INVENTION

First Embodiment

A case where a soccer game is executed by a home game device will be described as a first embodiment to which the present invention is applied, with reference to FIGS. 1 to 19.

[Description of Construction]

Figure 1:
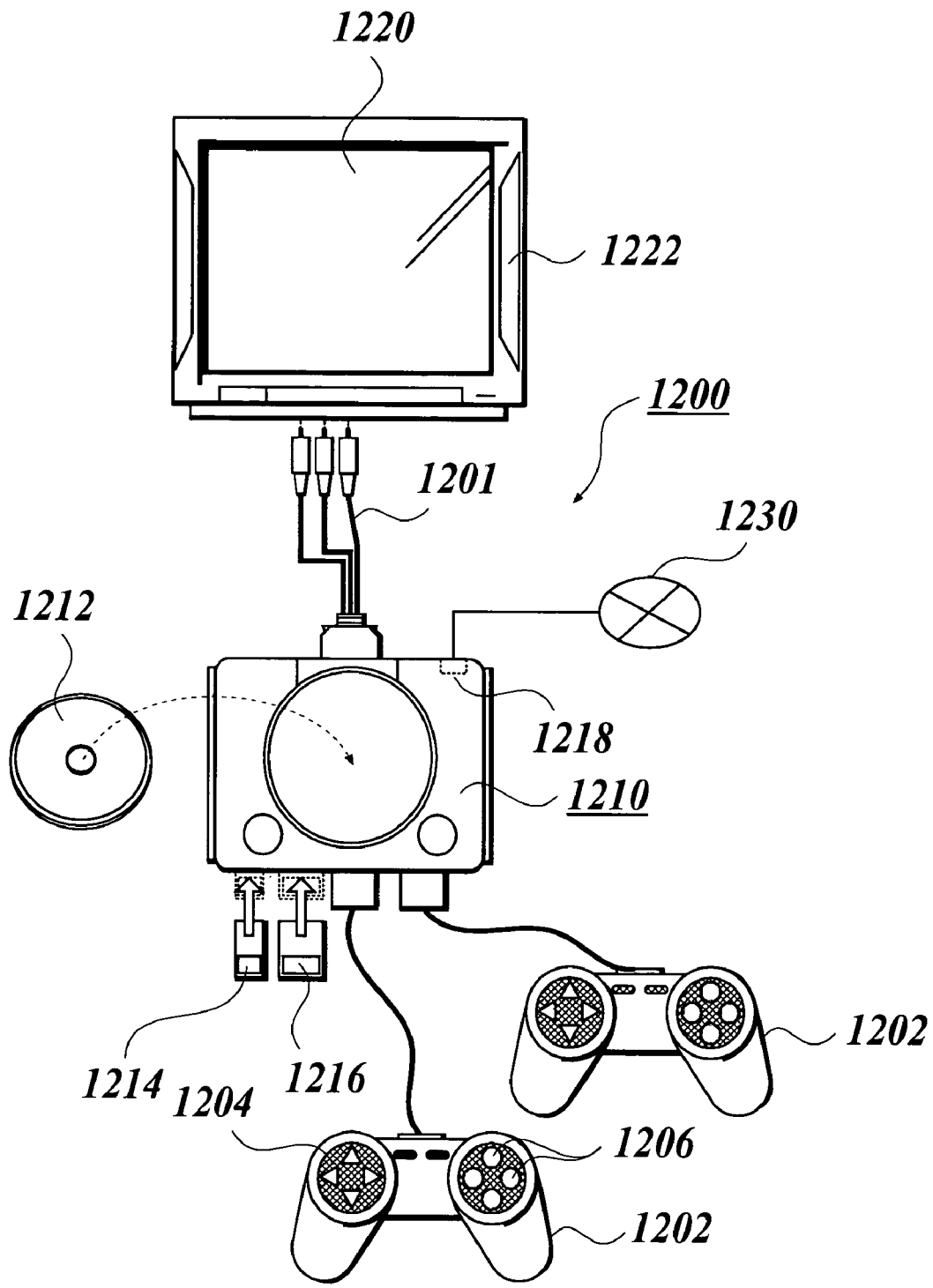
FIG. 1 is a diagram showing a construction when the present invention is applied to a home game device.

FIG. 1 is a diagram showing an example of the construction when the present invention is applied to a home game device. As shown in FIG. 1, the home game device 1200 comprises a game controller 1202, a main body device 1210, and a display 1220 having a speaker 1222. The game controller 1202 is connected to the main body device 1210, and the main body device 1210 and the display 1220 are connected to each other by a cable 1201 through which a video signal, an audio signal, etc. can be transmitted.

The game controller 1202 has a direction key 1204 for enabling a player to input a game operation and button switches 1206, and outputs an operation input signal to the main body device 1210.

The main body device 1210 is equipped with an operation processing device such as CPU or the like, an IC memory and a reading device for an information storage medium such as CD-ROM 1212 or the like, and carries out various kinds of game processing on the basis of the game information read out from the CD-ROM 1212 and the operation signal from the game controller 1202 to generate video signals for the game screen and audio signals for game sounds.

The main body device 1210 outputs the generated video signals and audio signals to a display 1220 to display game images on the display 1220 and also to output the game sounds from a speaker 1222. The playing person can enjoy the soccer game by manipulating the game controller 1202 while watching the game screen displayed on the display 1220.

Game information which is information such as programs, data, etc. necessary to execute the game processing by the main body device 1210 is stored in an information storage medium to be detachably mounted in the main body device 1210, such as CD-ROM 1212, an IC memory 1214, a memory card 1216 or the like. Alternatively, the main body device 1210 is connected to a communication line 1230 via a communication device 1218 equipped to the main body device 1210 to obtain the game information from an external device. Here, the communication line 1230 means a communication path through which data can be received/transmitted. That is, the communication line 1230 means a communication network containing LAN based on an exclusive line (exclusive cable), Ethernet (registered trademark) or the like for direct connection, a telephone communication network, a cable network, the Internet or the like. The communication method may cover both of a wired mode and a wireless mode.

[Description of Principle]

Next, the principle of displaying/outputting a power distribution according to the present embodiment will be described.

Figure 2A:
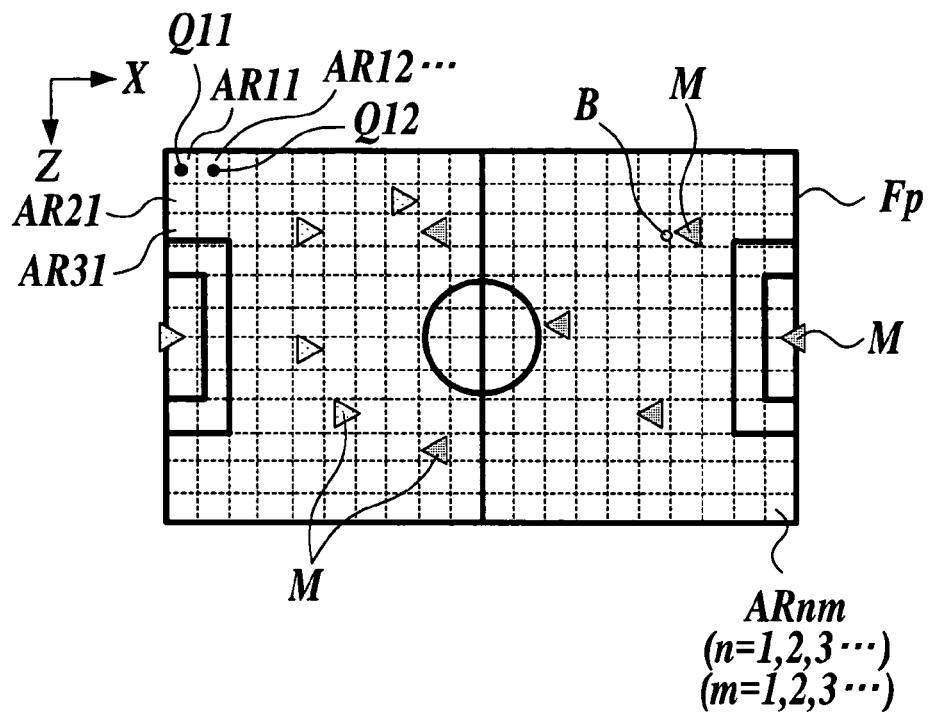
FIGS. 2A and 2B are conceptual diagrams showing a power distribution calculating method according to a first embodiment.
Figure 2B:
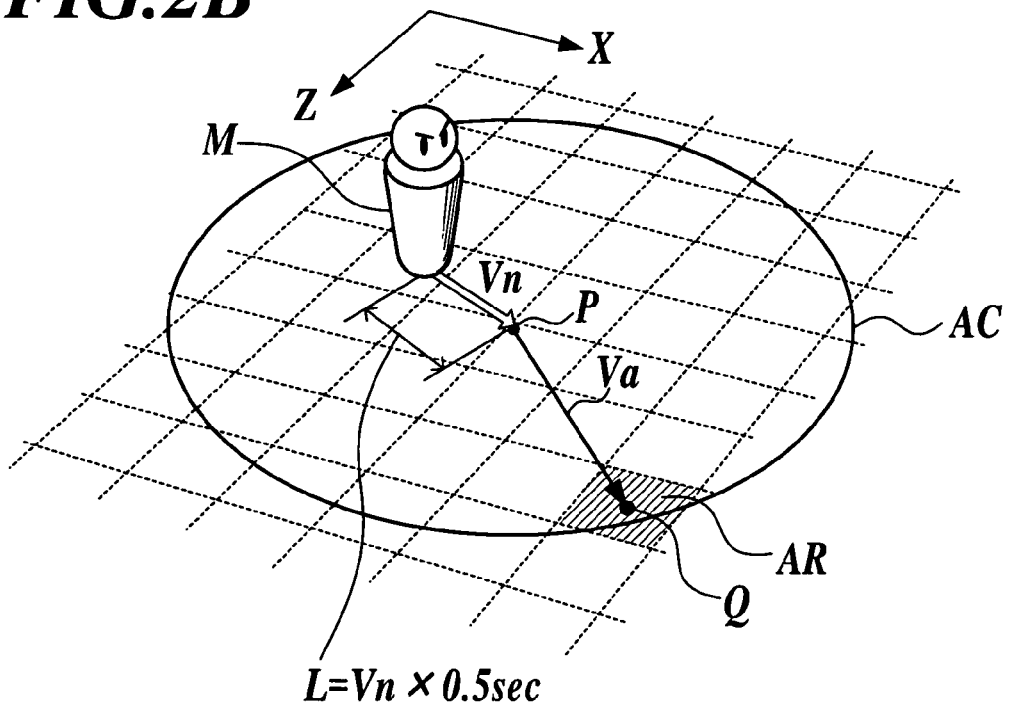

FIGS. 2A and 2B are conceptual diagrams showing the method of calculating the power distribution according to the present embodiment. FIG. 2A corresponds to an overhead view of a pitch. A triangular mark indicates a player M and the right/left direction of the triangle indicates the attack direction. The pitch corresponds to the court of the soccer and it is a range surrounded by touch lines and goal lines.

According to the present embodiment, meshed virtual areas AR are set in a pitch Fp disposed at an object space (virtual space). For example, the long-side direction of the pitch Fp is set to the X-axis coordinate while the short-side direction of the pitch Fp is set to the Z-axis coordinate, and the areas AR are arranged in a matrix form along the X-axis and Z-axis directions as a whole. Each area AR is identified by a representative point Q having an XZ coordinate value. The specific ratio in scale of the area AR is set so that each area AR is set to about 2 m (meter) square with respect to the pitch Fp of "105×68 m" in actual size. The representative point Q is set substantially to the center-of-gravity position of the area AR, for example. However, it may be properly set to any position insofar as it is contained in the area AR.

According to the present embodiment, for each area AR set in the pitch Fp, a player that can reach the area at the earliest time is identified. The area AR is then judged as the power range of the player M and the power range of the team to which the player M belongs, and a power distribution in the pitch Fp is determined.

Specifically, as shown in FIG. 2B, a virtual moving point P of each player M to which the player M will move from the current position coordinate as a starting point in a predetermined time period (for example, for 0.5 second) is successively calculated on the basis of the current speed Vn of the player M for each of the players M arranged on the pitch Fp, and an area AR whose representative point Q is contained in a predetermined arrival time calculation range AC having the virtual moving point P at the center thereof (hereinafter referred to as "an area AR in the arrival time calculation range AC") is selected. For example, the arrival time calculation range AC is set to the range of XZ coordinate values or the range of polar coordinates of the virtual moving point P which are located within 15 m in diameter from the virtual moving point P of the player M in actual size.

If the area AR of the arrival time calculation range AC is selected, the distance PQ from the virtual moving point P to the representative point Q is divided by the ability speed Va, which is one of ability parameters preset for each player, to calculate the arrival time T in which the player M will arrive at the representative point Q. More specifically, the difference in coordinate value between the virtual moving point P and the representative point Q is converted into the actual distance (meter) on the basis of the ratio between the actual size of the pitch "105×68 m(meters)" and the XZ coordinate value, and then divided by the ability speed Va (for example, the maximum speed of the player M, unit: m/s) to calculate the arrival time T.

That is, according to the present embodiment, the arrival time T is not calculated by making a strict dynamic simulation on the basis of the mass, acceleration ability, etc. of the player M, but calculated by setting a virtual moving point P as a starting point for the calculation of the arrival time and taking the inertia of the motion of the player M into consideration to calculate the arrival time T. Accordingly, the processing load associated with the calculation of the arrival time T is reduced, so that the processing speed can be increased.

Figure 3:
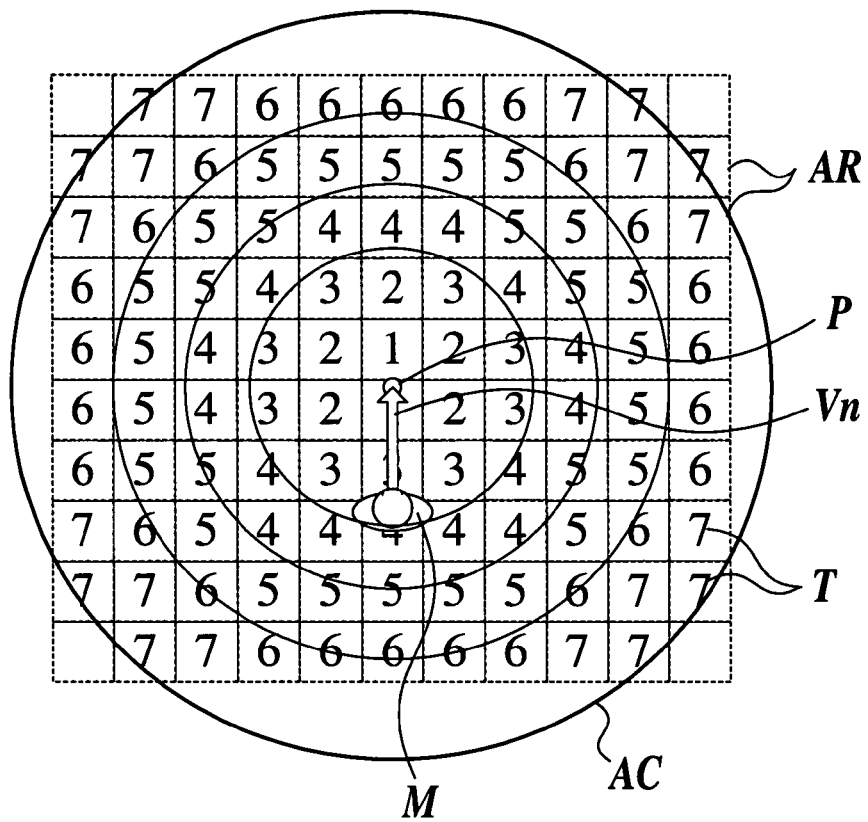
FIG. 3 is a diagram showing an example of an arrival time T of a player M.

Considering the arrival time T for a player M, as shown in FIG. 3, for example, the arrival time T is calculated substantially concentrically with the virtual moving point P at the center thereof (each numeric value in FIG. 3 represents an approximate number of seconds of the arrival time T).

When the arrival time T for each area AR contained in the arrival time calculation range AC is calculated for each player M on the pitch Fp, each player M that can arrive at each area AR in the minimum arrival time T is searched for in regard to all the areas AR set in the pitch Fp. The area AR is then judged as the power range of the player M that can reach this area AR in the minimum arrival time T, and judged as a power range, that is, a predominant range of the team to which the player belongs, that is, the predominant range. Accordingly, the power distribution of the pitch Fp can be determined.

Figure 4:
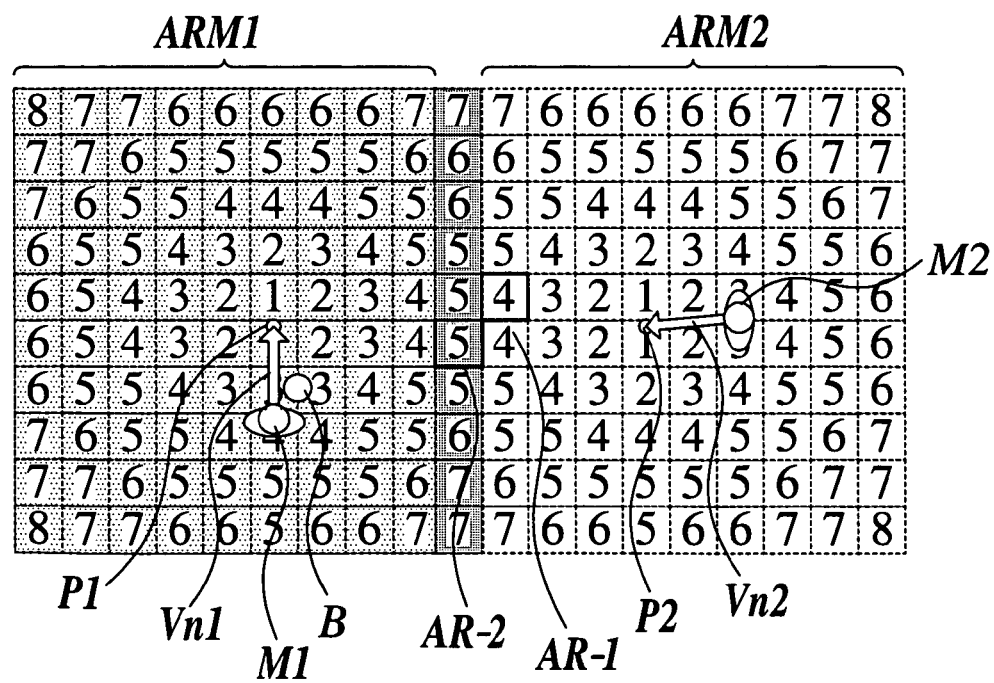
FIG. 4 is a diagram showing an example of the power distribution when a plurality of players M are proximate to one another.

For example, FIG. 4 is a diagram showing an example of the power distribution when a plurality of players M are proximate to one another. For example, since a player M2 can arrive at an area AR-1 earlier than a player M1, and the area is judged as the predominant range of the player M2. With respect to an area AR-2 which corresponds to the middle position between the players M1 and M2 and at which the players M1 and M2 would arrive in the same arrival time T, it is judged as an neutral range which does not belong to the power of any team. As described above, in the case of FIG. 4, a meshed area $AR_{M1}$ at the left side of FIG. 4 corresponds to the predominant range of the player M1, and a non-meshed area $AR_{M2}$ at the right side of FIG. 4 corresponds to the predominant range of the player M2.

Furthermore, according to the present embodiment, it is estimated whether the area AR can be regarded as an effective space under a soccer game circumstance, such that a power distribution which is sectionalized into the space and the other area is determined.

Figure 5:
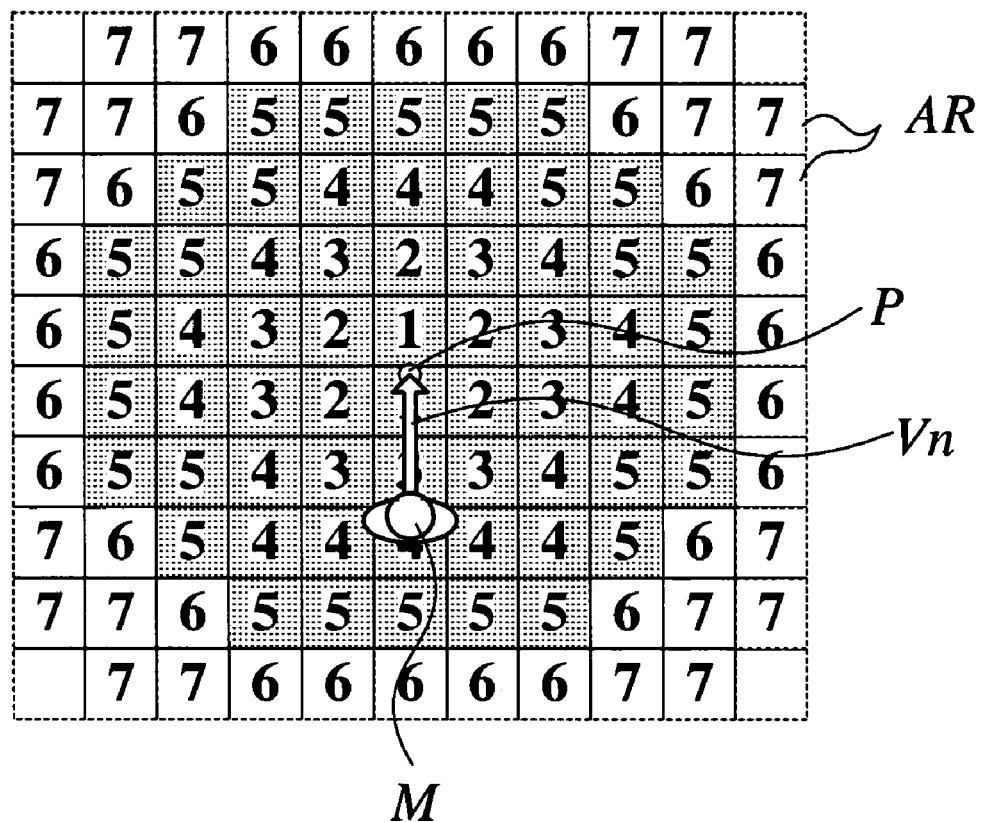
FIG. 5 is a diagram showing the concept of a space.

FIG. 5 is a conceptual diagram showing a space in the present embodiment. As shown in FIG. 5, an area AR in which the arrival time T of the player M is not less than a predetermined power range judgment time TS (for example, 6 seconds in the case of FIG. 5) is judged as a space, and an area AR in which the arrival time T of the player M is less than the power range judgment time TS is judged as not a space, but as a predominant range of any one team. Specifically, for each area AR, the arrival time T needed to arrive at the area AR is subtracted from the power range judgment time TS, and the subtraction result is set as a space estimation point. An area AR in which the space estimation point is a negative value is set as a space. In FIG. 5, a meshed range represents an area which is judged as a power range of the player M, and a non-meshed area represents a space.

In the present embodiment, at least one of the predominant range and the space is displayed on the game screen. The game playing person can simply identify areas AR corresponding to the predominant ranges of the players of the playing person's team and areas AR containing spaces.

Figure 6:
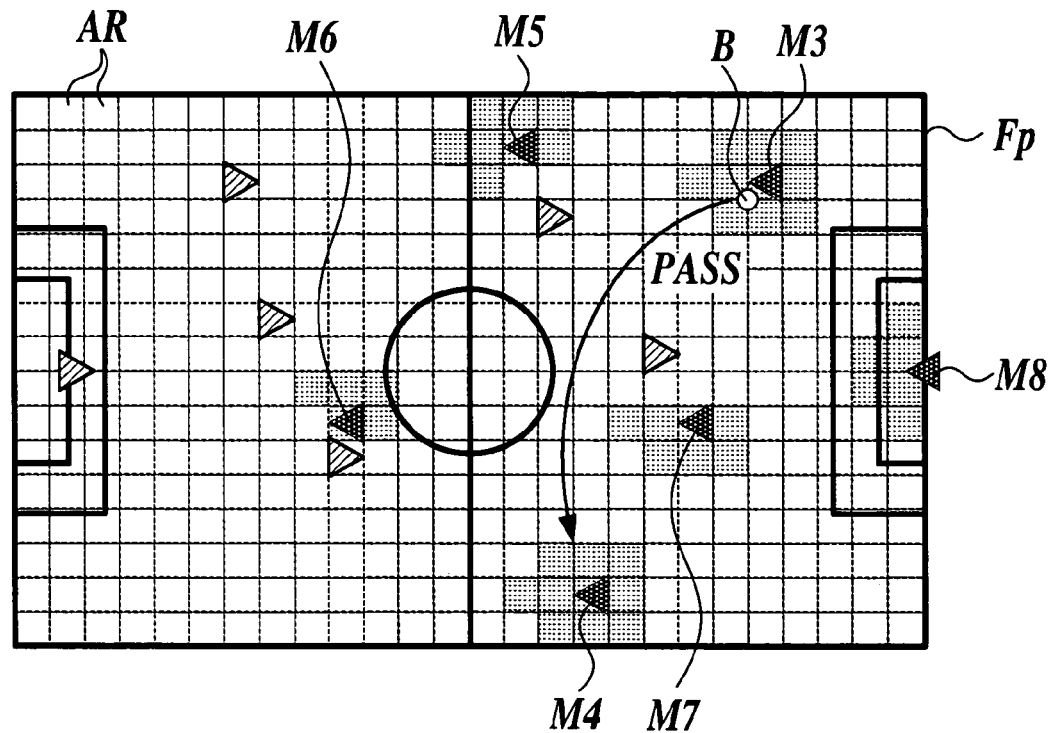
FIG. 6 is a conceptual diagram when a predominant range is displayed.

For example, FIG. 6 is a conceptual diagram when predominant ranges of the playing person's team are displayed, and it is an overhead view of the pitch Fp. FIG. 6 shows a scene that a player M3 of the playing person's team (a triangular mark represents each player, and the direction of the triangle represents the attack direction) keeps the ball B (this means that the ball is under the control of the playing person), and meshed areas in FIG. 6 correspond to the predominant ranges of the playing person's team. The game playing person can recognize by viewing the display of the predominant ranges, that rival-team players are near the players M5 to M7 and thus the predominant ranges of these players M5 to M7 are small, so that if the ball is passed to these players, the ball may be taken by the rival-team players with high probability. Conversely, the game playing person can recognize that a player M4 has a broad predominant range and thus if the ball is passed to the player M4, the ball B can be surely delivered to the player M4. Accordingly, even when the game playing person is a beginner, the game playing person can understand that it is one of good choices to fly-pass the ball (kick the ball up to the air for passing) to the player M4 under the situation of FIG. 6. It is needless to say that the predominant ranges of the COM team may be displayed to the contrary.

Figure 7:
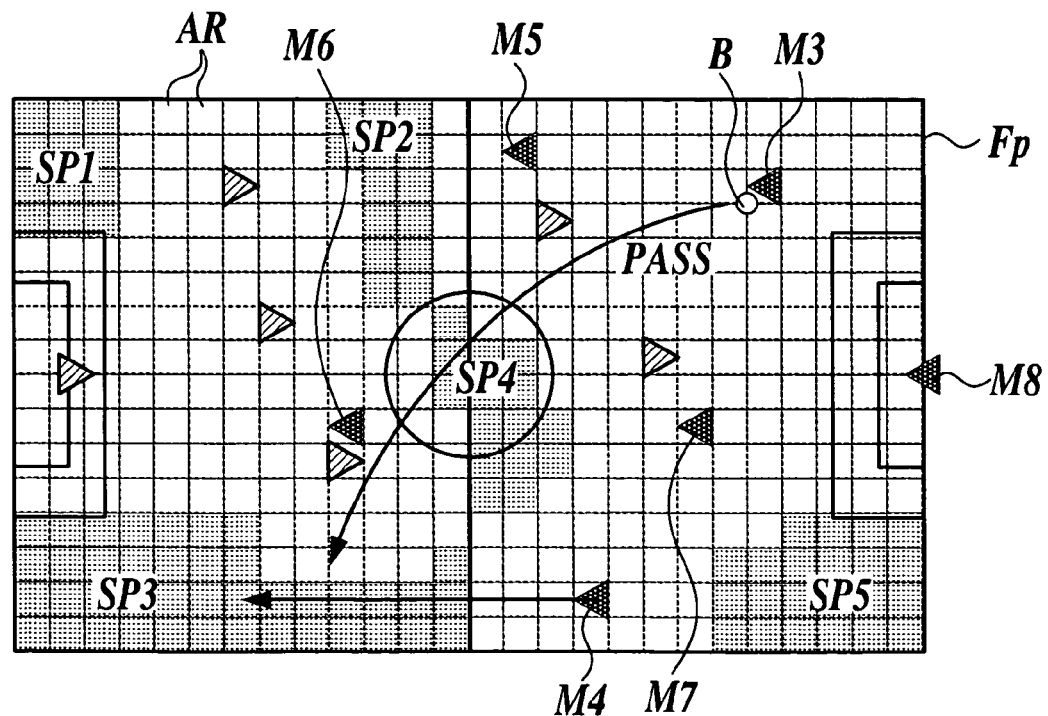
FIG. 7 is a conceptual diagram when a space is displayed.

FIG. 7 is a conceptual diagram when a space is displayed, and shows a scene that the player M3 of the playing person's team keeps the ball B. Objects (meshed display portions in FIG. 7) of spaces SP1 to SP5 are displayed on the pitch Fp as shown in FIG. 7, whereby the game playing person can simply understand that the space SP3 exists at the left side of the rival-team goal. At this time, if the player M4 is running to the space SP3, the rival-team goal can be attacked at a dash by fly-passing the ball to the player M4.

[Description of Functional Block]

Figure 8:
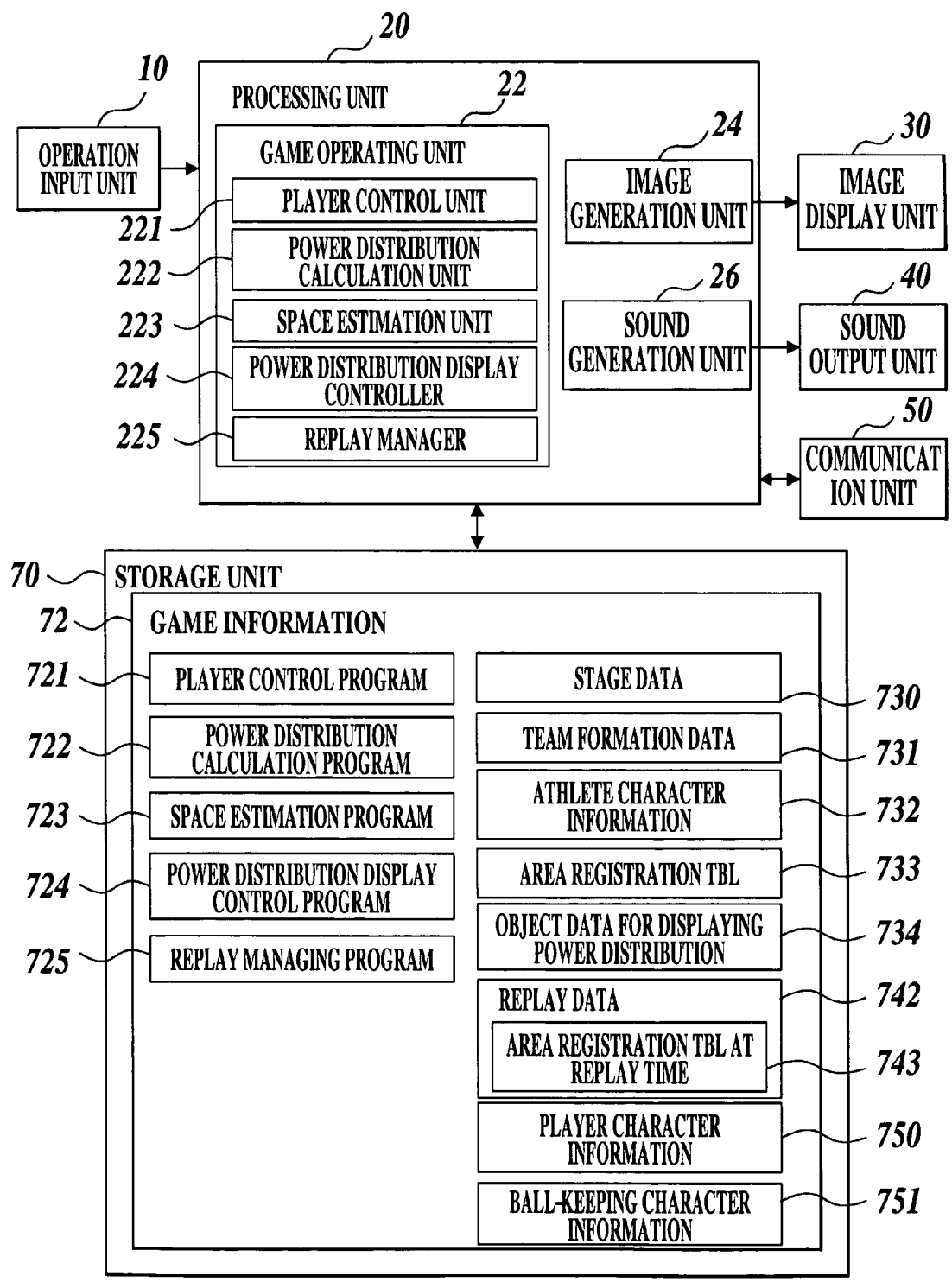
FIG. 8 is a functional block diagram showing an example of the functional construction according to the first embodiment.

FIG. 8 is a functional block diagram showing an example of the functional construction according to the present embodiment. As shown in FIG. 8, the home game device 1200 comprises an operation input unit 10 for inputting an operation from a game playing person, a processing unit 20 for carrying out the operation processing associated with the control of the device and the game, an image display unit 30 for displaying and outputting a game screen, a sound output unit 40 for outputting game sounds, a communication unit 50 and a storage unit 70 for storing various kinds of programs and data.

The operation input unit 10 is implemented by a button switch, a lever, a dial, a mouse, a keyboard and various kinds of sensors, and outputs the operation input of the playing person as an operation input signal to the processing unit 20. In the present embodiment, the game controller 1202 of FIG. 1 corresponds to the operation input unit 10.

The processing unit 20 carries out various kinds of operation processing such as the overall control of the home game device 1200, the game operation, etc. The function thereof is implemented by hardware such as CPU (CISC type, RISC type), ASIC (gate array or the like), etc. and relating control programs, etc. In FIG. 1, the operation processing device such as CPU, etc. equipped to the main body device 1210 corresponds to the processing unit 20.

The processing unit 20 mainly contains a game operating unit 22 for carrying out the operation processing associated with the game, an image generation unit 24 for generating an image signal for displaying a game screen from various kinds of data obtained by the processing of the game operating unit 22, and a sound generation unit 26 for generating a sound signal to output game sounds such as an effective sound, BGM, etc.

The game operating unit 22 executes various kinds of game processing on the basis of the operation input signal from the operation input unit 10 and programs and data read out from the storage unit 70. For example, it executes the processing arranging objects such as the pitch Fp, the players M and the ball B in the virtual space and controlling the movement of these objects, a cross judgment (hit check) of objects, calculation of a line judgment as to whether the ball B is moved to the outside of the touch line, calculation of a game result (score), arrangement of a virtual camera (point of view), determination of a visual line direction and an angle of field, etc.

The game operating unit 22 according to the present embodiment contains a player control unit 221, a power distribution calculation unit 222, a space estimation unit 223, a power distribution display controller 224 and a replay manager 225.

The player control unit 221 executes the processing associated with the control of the players M such as the control of the movement and operation of players M belonging to the playing person's team on the basis of the operation signal input from the operation input unit 10 and the automatic control of the movement and operation of players M belonging to the COM team which are automatically controlled by the computer.

Furthermore, the player control unit 221 sets a player M serving as a player character, sets a player M keeping the ball, stores these information as player character information 750 and ball-keeping character information 751 respectively into the storage unit 70, and manages these information. Here, the player character means a player among the players of the playing person's team which is operated by the game playing person, that is, a player being operated.

On the basis of the ability speed Va, the power distribution calculation unit 222 calculates the arrival time T needed to arrive at the representative point Q of each area AR contained in each arrival time calculation range AC for each player M on the pitch Fp. The processing of identifying a player M that can arrive at each AR of the pitch Fp earliest is carried out for each area AR, and the AR is judged as the power range of the player M and the power range of the team to which the player belongs, thereby determining the overall power distribution of the pitch Fp.

The space estimation unit 223 calculates the space estimation point from the minimum arrival time calculated by the power distribution calculation unit 222.

The power distribution display controller 224 controls display/non-display of objects to display the spaces and the predominant ranges of the playing person's team. Specifically, an object for displaying a predetermined space is arranged and displayed on an area AR identified as a space. An object for displaying a predetermined predominant range is arranged and displayed on an area AR identified as a predominant range of the playing person's team.

When it is judged that the game condition or the power distribution satisfies a predetermined storage condition (a condition sufficient to display the replay), the replay manager 225 stores information for displaying the replay as replay data 742 into the storage unit 70 and manages the information. As the storage condition associated with the power distribution may be considered as a case where the number of areas which constitute a conjunct area and are judged as spaces increases to a predetermined number or more, and thus relatively large spaces are created in clusters or a case where these spaces exist at a specific place (satisfying a coordinate condition) such as the right or left side of the goal.

The image generation unit 24 is implemented by an operating device such as CPU or DSP, the control program therefor, an IC memory for drawing frame such as a frame buffer, etc. The image generation unit 24 executes geometrical conversion processing or shading processing on the basis of the operation result of the game operating unit 22 to generate 3DCG images for displaying the game screen, and outputs the video signals of the generated images to the image display unit 30.

The sound generation unit 26 is implemented by an operating device such as CPU or DSP and the control program therefor. The sound generation unit 26 generates sounds such as an effective sound or BGM used in the game and outputs the video signal to the sound output unit 40.

The image display unit 30 displays the game screen while re-drawing the screen of one frame per every 1/60 second on the basis of the video signals from the image generation unit 24. The image display unit 30 may be implemented by hardware such as CRT, LCD, ELD, PDP, HMD or the like. The display 1220 of FIG. 1 corresponds to the image display unit 30.

The sound output unit 40 is a device for outputting sounds such as an effective sound, BGM or the like on the basis of the audio signal from the sound generation unit 26, and the speaker 1222 of FIG. 1 corresponds to the sound output unit 40.

The communication unit 50 is connected to the communication line to carry out data communications with an external device. For example, it is implemented by Blue tooth (registered trademark), a module such as IrDa, a modem, TA, a jack and a control circuit for a wired communication table or the like. The communication device 1218 of FIG. 1 corresponds to the communication unit 50. The information associated with a protocol used when the communication unit 50 performs communication is stored in the storage unit, and properly read out therefrom to be used.

The storage unit 70 stores a system program (not shown) for implementing various functions for making the processing unit 20 perform integrated control of the home game device 1200, game information 72 containing programs and data necessary to execute the game, etc. The storage unit 70 can be implemented by an information storage medium such as various kinds of IC memories, a hard disk, CD-ROM, MO, DVD or the like. In the example of FIG. 1, CD-ROM 1212, the IC memory 1214 and the memory card 1216 corresponds to the storage unit 70.

The game information 72 contains programs and data for making the processing unit 20 function as the game operating unit 22. The programs particularly contain a player control program 721 for making the processing unit 20 function as the player control portion 221, a power distribution calculation program 722 for making the processing unit 20 function as the power distributing calculator 222, a space estimation program 723 for making the processing unit 20 function as the space estimation unit 223, a power distribution display control program 724 for making the processing unit 20 function as power distribution display controller 224, and a replay managing program 725 for making the processing unit 20 function as the replay manager 225.

As data, stored are stage data 730 contained in object data for displaying the pitch Fp, the ball B, etc., team formation data 731 containing identification information of players belonging to the playing person's team and the COM team, athlete character information 732, an area registration TBL (table) 733, and object data 734 for displaying power distribution which contain object data such as predominant-range displaying objects and space displaying objects. Further, stored is data (not shown) for defining various behaviors (for example, actions such as dribbling, passing, run-trying, heading, etc.).

As data to be properly renewed during execution of the game, stored are replay data 742, player character information 750 containing identification information of the player character (means the player being operated), and ball-keeping character information 751 containing the identification information of a player M keeping the ball B. In addition, though not shown, various kinds of data associated with the execution of the soccer game such as scores, a game play time, etc. are temporarily stored.

FIG. 9 shows an example of the athlete character information 732 according to the present embodiment. The athlete character information 732 is prepared for each player M, and it contains player identification information 732a containing the names of players, etc., affiliated team identification information 732b, a behavior type 732c containing the type of the current behavior (a series of operations or actions) of the player M, a current position coordinate 732d on the pitch Fp, a speed 732e containing the current speed Vn (which is a vector value and contains the size and direction), an ability speed 732f corresponding to one of ability parameters, and object data 732g containing model data and texture data to display the player M so as to relate to one another.

FIG. 10 is a diagram showing an example of the area registration TBL 733 according to the present embodiment. As shown in FIG. 10, the area registration TBL 733 stores area identification information 733a of an area AR, the representative point coordinate 733b of a representative point Q, the minimum arrival time 733c containing the minimum arrival time T judged by the power distribution calculation unit 222 as described above, player identification information 733d of a player that can arrive at the area AR in the minimum arrival time T, predominant team identification information 733e containing the affiliated team identification information of the player M, and a space estimation point 733f set by the space estimation unit 223 so as to relate to one another.

The area registration TBL 733 at the point that the replay data is created is contained as a replay-time area registration TBL 743 in the replay data 742.

When the area registration TBL 733 is initialized, for example, a default value "10" is stored in the minimum arrival time 733c, and predetermined information indicating no applicable player, predetermined information indicating neutrality and a default value "0" are stored in the player identification information 733d, the predominant team identification information 733e and the space estimation point 733f, respectively. Accordingly, an area AR that is not contained in any arrival time calculation range AC of any player M is set like the area AR 13 of FIG. 10, for example.

[Description (1) of Processing Flow]

Next, the flow of the processing associated according to the display output of the power distribution during game play according to the present embodiment will be described with reference to FIGS. 11 to 14 and FIGS. 15A to 15C.

Here, in order to implement the processing described above, the processing unit 20 reads out and executes the player control program 721, the power distribution calculation program 722, the space estimation program 723 and the power distribution display control program 724.

Figure 11:
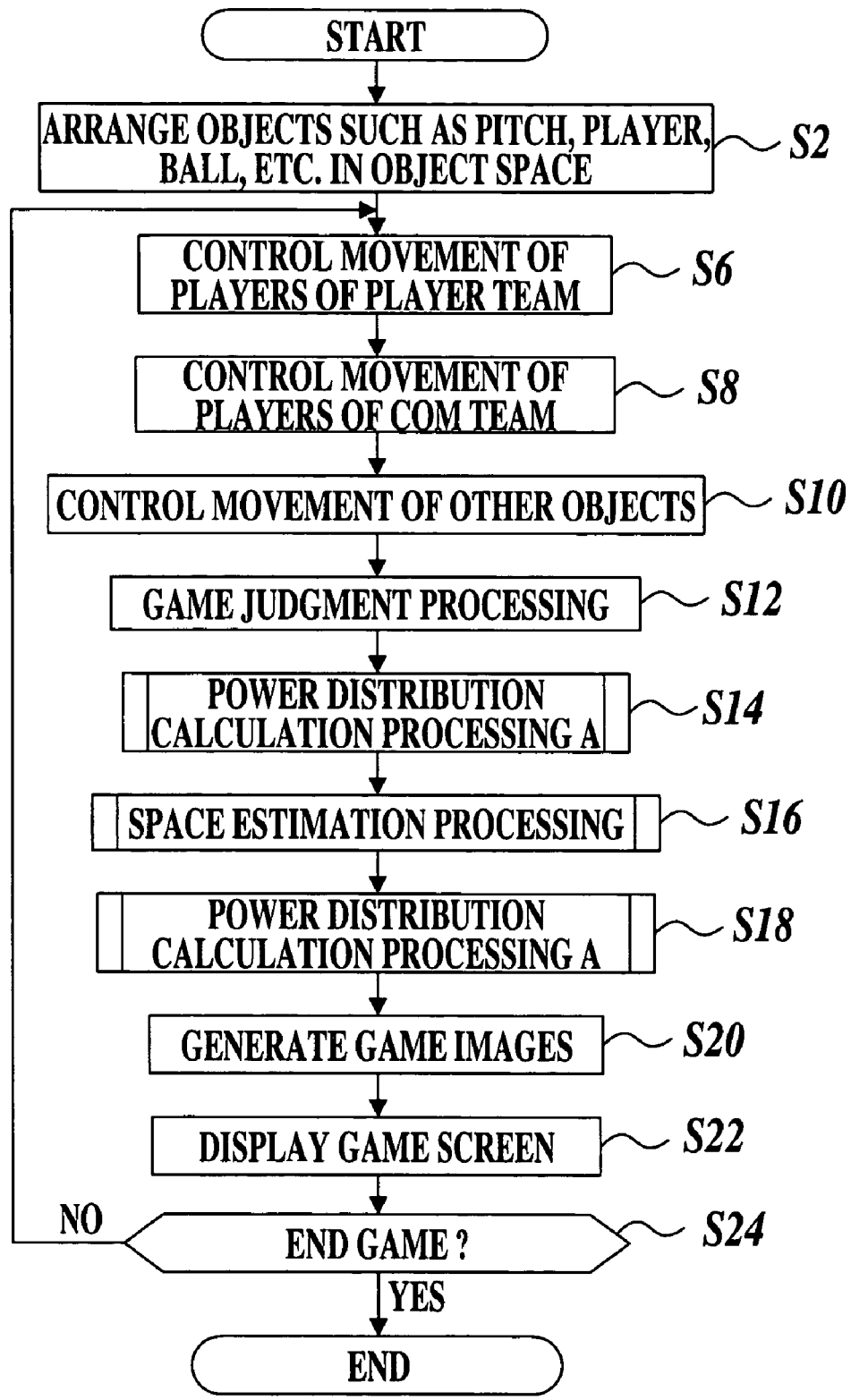
FIG. 11 is a flowchart showing the overall processing flow according to the first embodiment.

FIG. 11 is a flowchart showing the flow of the overall processing according to the present embodiment. First, the game operating unit 22 arranges objects such as the pitch Fp, the players M, the ball B, etc. (step S2).

Subsequently, the player control unit 221 controls the movements of the players M of the playing person's team on the basis of the operation input from the game playing person (step S6), and then controls the movements of the players M of the COM team (step S8). Furthermore, the player control unit 221 controls the movements of the other objects such as the ball B, etc. (step S10).

In more detail, the player control unit 221 controls some players M indicated by the game playing person on the basis of the operation input signal, and controls the other players M of the playing person's team according to a predetermined control routine. With respect to the players M of the COM team, the player control unit 221 automatically controls them according to a predetermined control routine.

If the control of the movements of the objects is executed, the game operating unit 22 makes game judgments (step S12). For example, a judgment as to the touch between the ball B and the leg portion of a player M, a line judgment as to whether the ball is moved to the outside of the touch line or not, a judgment as to whether the score is made or not, etc. are carried out.

Figure 12:
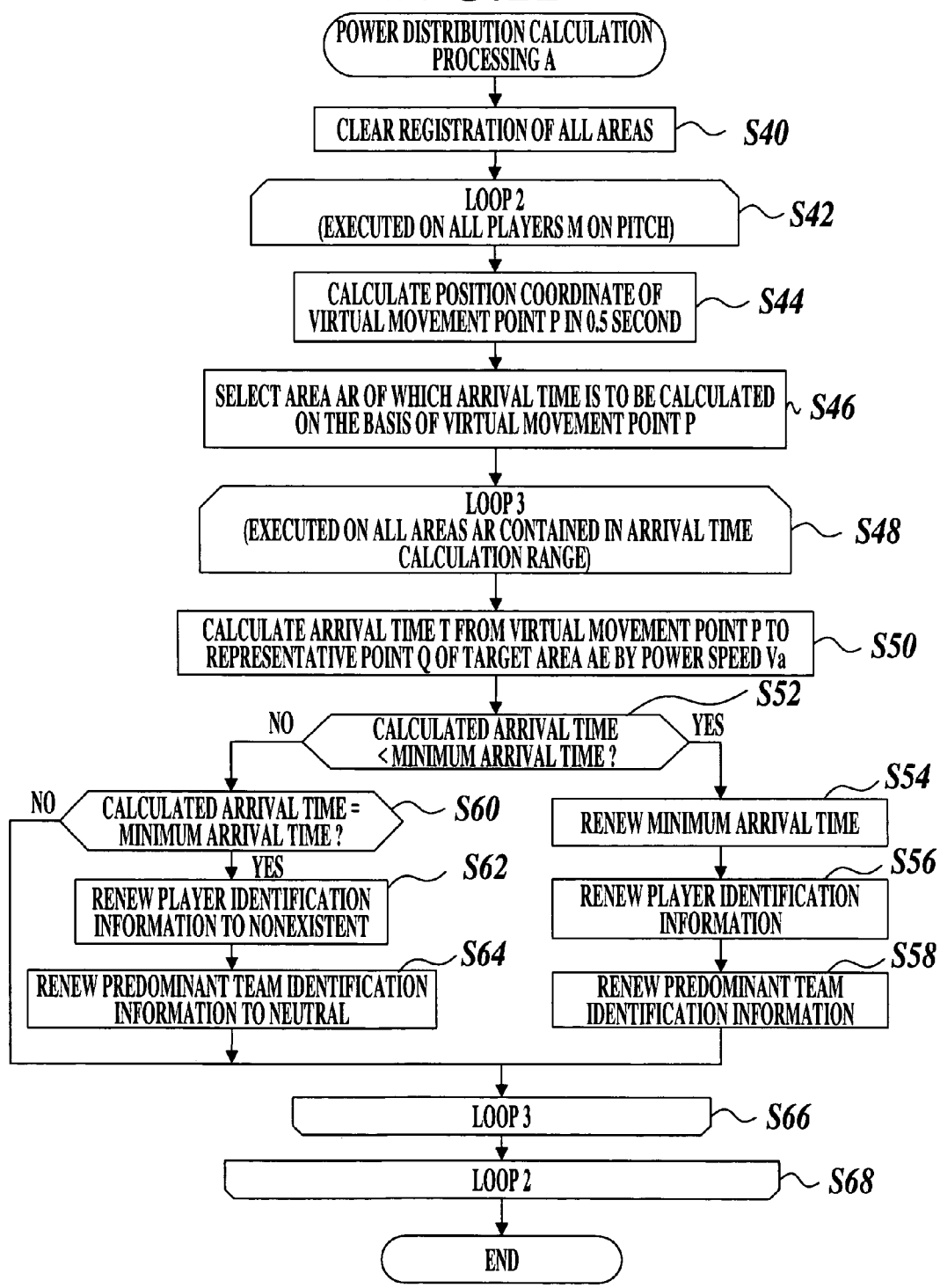
FIG. 12 is a flowchart showing the flow of power distribution calculation processing A.

Subsequently, the power distribution calculation unit 222 executes the power distribution calculation processing A (step S14). FIG. 12 is a flowchart showing the flow of the power distribution calculation processing A according to the present embodiment. As shown in FIG. 12, the registration of the minimum arrival time 733c, the player identification information 733d, the predominant team identification information 733e and the space estimation point 733f is deleted and cleared (step S40). Specifically, a default value "10" is stored in the minimum arrival time 733c, and predetermined information indicating that there is no applicable player, predetermined information indicating neutrality is stored in the predominant team identification information 733e, and a default value "0" is stored in the space estimation point 733f. Thereby, the initialization is carried out.

Subsequently, the loop 2 (the processing of steps S42 to S68) is executed for each of all the players M on the pitch Fp.

In the loop 2, the position coordinate of the virtual moving point P of a player M to be processed is first calculated (step S44). Specifically, the position coordinate 732d and the speed 732e are referred to in the athlete character information 732 and the position coordinate at which the player M arrives after running from the current position at a speed of Vn for 0.5 second is calculated.

Subsequently, an area AR of which the arrival time T of the player M is to be calculated is selected from the areas AR constituting the pitch Fp (step S46). Specifically, an area AR whose representative point Q is contained within the arrival time calculation range AC from the position of the virtual moving point P of the player M is selected by referring to the representative coordinates 733b of the area registration TBL 733, and the area identification information 733a of the selected area AR is temporarily stored in the storage unit 70.

Subsequently, the power distribution calculation unit 222 executes the loop 3 (steps S48 to S66) on each area AR contained in the arrival time calculation range AC successively.

In the loop 3, the arrival time T of the player M from the virtual moving point P to the representative Q of the area AR to be processed is first calculated (step S50). Specifically, the distance from the virtual moving point P to the representative point Q is calculated, and then multiplied by a predetermined rate to be converted into the actual distance (for example, meter). Then, the ability speed 732f is referred to in the athlete character information 732 of the player M, and the converted value is divided by the ability speed Va to calculate the arrival time T.

Subsequently, the calculated arrival time T and the minimum arrival time 733c registered in the area AR concerned are compared with each other (step S52).

When the calculated arrival time T is smaller than the minimum arrival time 733c (step S52; YES), the power distribution calculation unit 222 registers the calculated arrival time T into the minimum arrival time 733c of the area AR (step S54), and registers the player identification information 732a into the player identification information 733d (step S56). Furthermore, the power distribution calculation unit 222 registers the affiliated team identification information 732b of the player M into the predominant team identification information 733e (step S58). Then, the loop 3 is finished.

When the calculated arrival time T is equal to the minimum arrival time 733c registered in the area AR (step S52; No→step S60; YES), predetermined information indicating that there is no applicable player is registered in the player identification information 733d of the area AR (step S62), and predetermined information indicating neutrality is registered in the predominant team identification information 733e (step S64).

After the loop 3 is finished, the same processing is carried out on a next player M. If the loop 3 is executed on all the players M, the power distribution calculation processing A is finished. Through the power distribution calculation processing A, information indicating which player's and which team's power range each area AR corresponds to is registered in the area registration TBL 733.

Subsequently, the space estimation unit 223 executes the space estimation processing in FIG. 11 (step S16).

Figure 13:
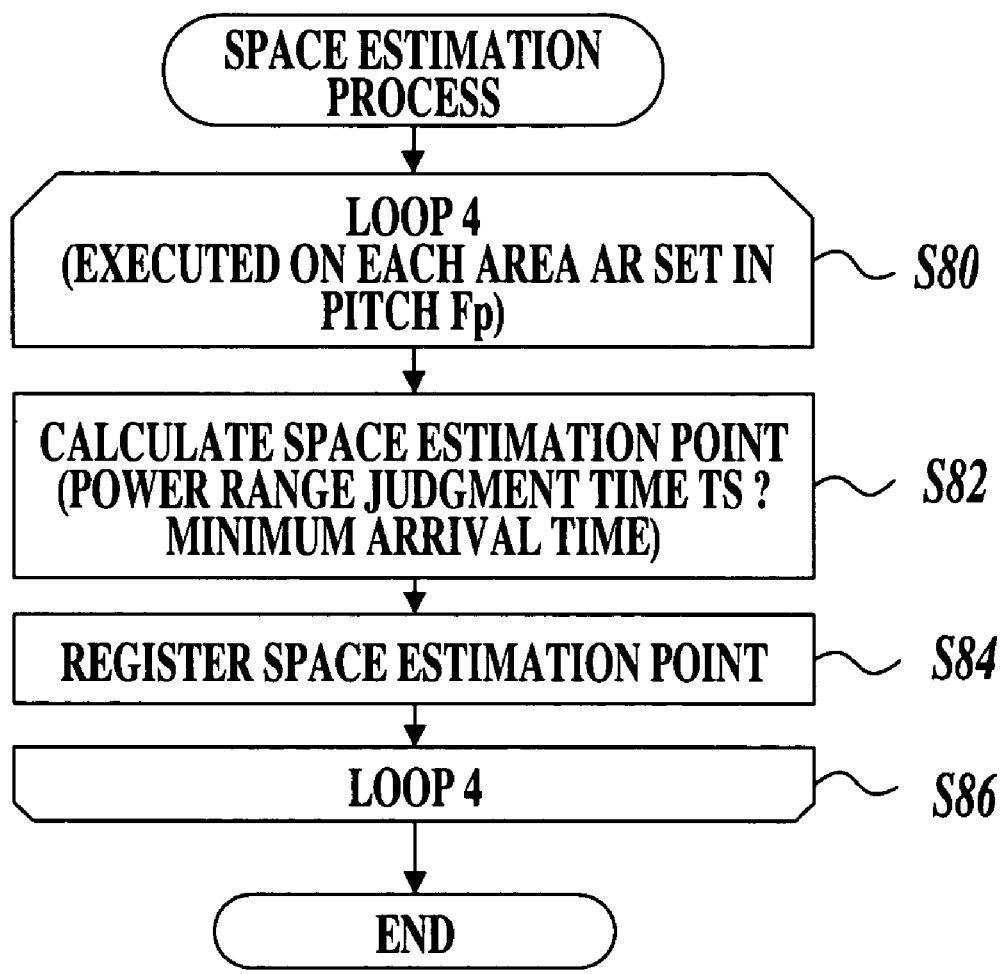
FIG. 13 is a flowchart showing the flow of space estimation processing.

FIG. 13 is a flowchart showing the flow of the space estimation processing of the present embodiment. As shown in FIG. 13, the space estimation unit 223 executes the processing of the loop 4 (steps S80 to S86) on each AR set in the pitch Fp successively.

In the loop 4, the space estimation point 733f of an area AR to be processed is first calculated (step S82), and registered in the area registration TBL 733 (step S84). Specifically, the minimum arrival time 733c of the area AR to be processed is referred to in the area registration TBL 733, the minimum arrival time 733c is subtracted from the power range judgment time TS (TS=5 seconds in the present embodiment), and the subtraction value is registered in the space estimation point 733f. For example, in the case of FIG. 10, for the area AR11, the space estimation point 733f is set to "1.8" (=5−3.2) and therefore the space estimation point 733f is set to a positive value. For the area AR12, the space estimation point 733f is set to "−0.2" (=5−5.2).

If the loop 4 is executed on all the areas AR of the pitch Fp, the space estimation processing is finished.

Subsequently, the power distribution display controller 224 executes the power distribution display processing A in FIG. 11 (step S18).

Figure 14:
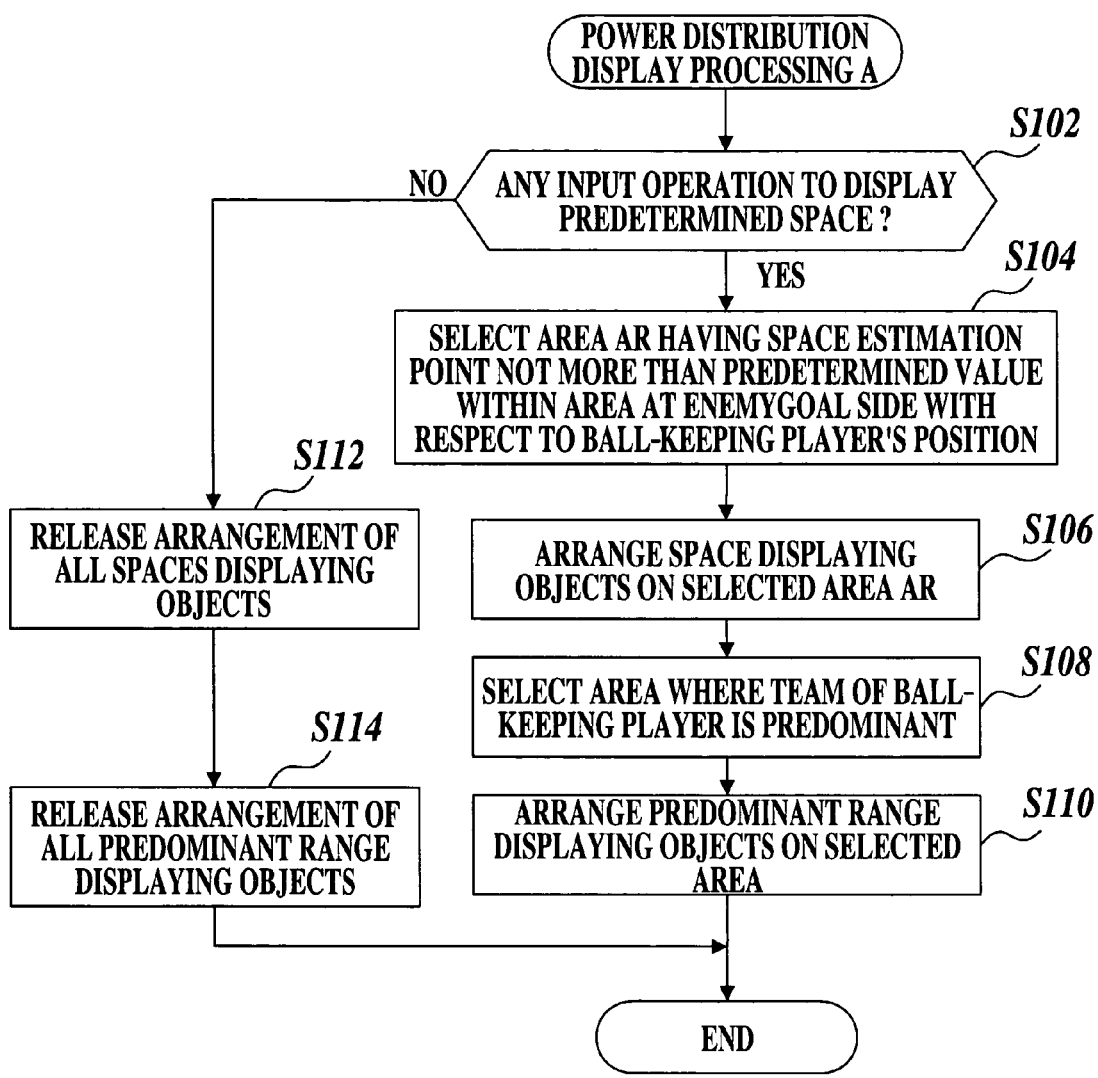
FIG. 14 is a flowchart showing the flow of power distribution display processing A.

FIG. 14 is a flowchart showing the flow of the power distribution display processing A according to the present embodiment. As shown in FIG. 14, the power distribution display controller 224 first judges whether a predetermined operation input is made as a power distribution output instruction from the operation input unit 10 (step S102). Specifically, when any one predetermined switch of the button switches 1206 of the game controller 1202 is pushed, an operation of displaying the power range of the playing person's team and spaces as a power distribution on the game screen is allowed to be input.

When the operation of displaying the power distribution is input (step S102; YES), areas AR whose space estimation points 733f are not more than a predetermined value are selected among areas AR closer to the rival-team goal than a player M keeping the ball B (step S104). Specifically, areas whose space estimation points 733f are negative values are selected. Here, the selected areas AR correspond to spaces.

Subsequently, predetermined space displaying objects are arranged in the selected areas AR (step S106). Specifically, objects displayed as being translucent light-blue are arranged on the upper surfaces of the corresponding areas AR.

Subsequently, areas AR where the team of the player M keeping the ball is predominant are selected among the areas AR of the pitch Fp (step S108), and predetermined predominant range displaying objects are arranged in the selected areas AR (step S110). Specifically, the predominant team identification information 733e of the area registration TBL 733 selects the same areas AR as the affiliated team identification information 732b of the player M keeping the ball B. For example, objects displayed as being translucent yellow are arranged as predominant range displaying objects.

When the objects are arranged, the power distribution display processing A is finished.

When the operation of displaying the power distribution is not input (step S102; NO), the arrangement of all the arranged space displaying objects is released (excluded from the object space) and they are made non-displayed (step S112). Likewise, the arrangement of all the arranged predominant range displaying objects are released and they are made non-displayed (step S114). Then, the power distribution display processing A is finished.

Subsequently, in FIG. 11, the image generation unit 24 generates as a game image, an image which will be obtained when the virtual space is viewed from a given virtual camera (step S20), and the image display unit 30 displays the game image (step S22).

Subsequently, the game operating unit 22 executed an end-game judgment. If a predetermined end-game condition is not satisfied (step S24; NO), the processing returns to step S6 to continue the game. If the end-game condition is satisfied (step S24; YES), the soccer game is finished.

Through the above-processing, the predominant range displaying objects and the space displaying objects can be displayed as the power distribution on the pitch Fp during the game play.

Figure 16:
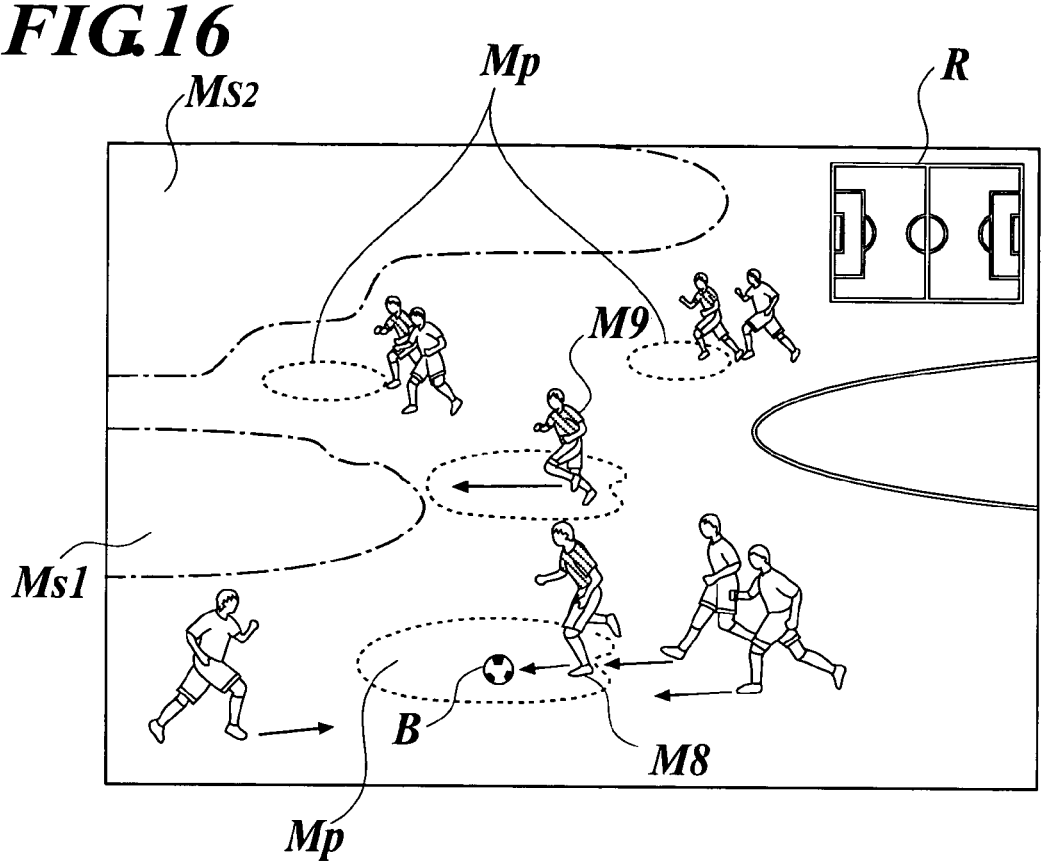
FIG. 16 is a diagram showing an example of the screen of a soccer game on which a power distribution is output during game play.

FIG. 16 is a diagram showing an example of the screen on which the power distribution is output during the game play in the present embodiment. It is assumed in FIG. 16 that the game playing person's team attacks in the leftward direction on the screen and the game playing person operates the player M8. Here, when the predetermined operation of displaying the power distribution is input from the game controller 1202, the predominant range displaying objects Mp indicating the ranges where the game playing person's team is predominant and space displaying objects Ms indicating the ranges where spaces are provided are displayed on the pitch Fp.

By displaying the predominant range displaying objects Mp and the space displaying objects Ms indicating spaces, the size of the predominant range displaying object MP of the player M9 running from the rear side of the player M8 is displayed as being broad in the case of FIG. 16, for example. This enables the game playing person to understand that the player M9 is not marked by the COM team.

Furthermore, since a space displaying object Ms1 is displayed in front of the player M9, it is understood that there is a space. Therefore, the game playing person understands that it is an effective strategy to kick the ball B toward the player M9 to pass the ball B to the player M9. Alternatively, the game playing person understands that there is also a space at the upper left side (right side) on the screen, and thereby the game playing person understands that it is also a good strategy to kick the ball B toward a player located in the vicinity of this space.

The predominant range displaying objects Mp and the space displaying objects Ms are not necessarily required to be displayed on the pitch Fp, and it may be possible to display them at the corresponding site of a radar display screen R for displaying the overall diagram of the pitch Fp.

[Description (2) of Processing Flow]

Next, the processing flow associated with the display output of the power distribution during the replay in the present embodiment will be described. In order to implement the processing described below, the processing unit 20 reads out and executes the power distribution display control program 724 and the replay managing program 725.

Figure 15A:
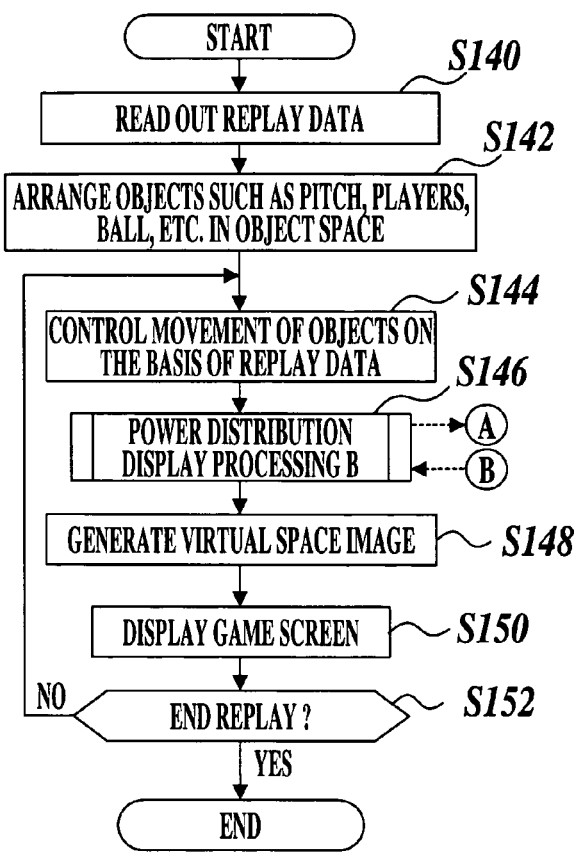
FIGS. 15A, 15B and 15C are flowcharts and diagram showing the flow of processing associated with the display output of the power distribution during the replay.
Figure 15B:
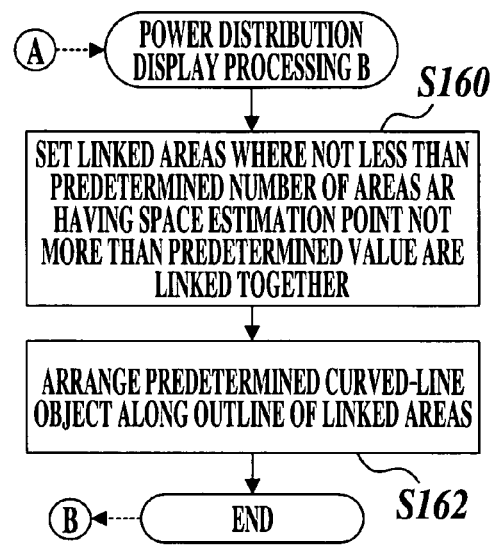
Figure 15C:
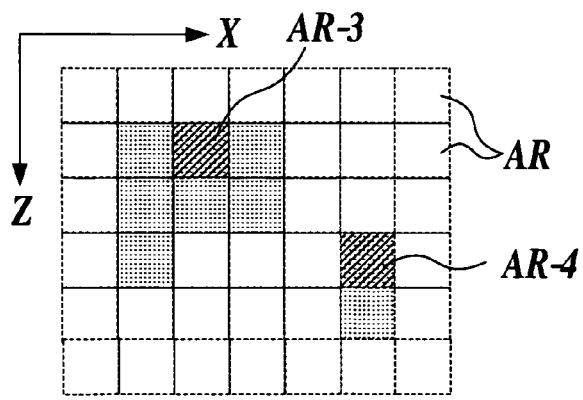

FIGS. 15A, 15B and 15C are flowcharts showing the processing flow associated with the display output of the power distribution during the replay in the present embodiment.

As shown in FIG. 15A, if the replay is carried out, the game operating unit 22 reads out replay data 742 (step S140). Objects such as the pitch Fp, the players M, the ball B, etc. are arranged in the virtual space on the basis of the replay data 742 (step S142), and the movements of these objects are controlled on the basis of the replay data 742 (step S144).

If the movement control of the objects is carried out, the power distribution display controller 224 executes the power distribution display processing B (step S146).

As shown in FIG. 15B, in the power distribution display processing B, the space estimation point 733f first sets a conjunct area where not less than predetermined number of areas AR having space estimation points 733f not more than a predetermined value (that is, areas AR judged as spaces) (step S160). Specifically, when there is an area judged as a space, it is judged whether an area AR adjacent to the area AR is a space or not. If it is a space, the latter space is judged as being contained in the same conjunct area. Furthermore, the judgment as to whether an area AR adjacent to the area AR constituting the conjunct area is a space or not is successively repeated. For example, in FIG. 15C, when the judgment number of the conjunction is set to "5", a cluster of spaces (meshed portions) containing the area AR-3 is judged as a conjunct area. However, a cluster of spaces containing the area AR-4 is not judged as a conjunct area.

If a conjunct area is set, the game operating unit 22 arranges predetermined curved-line objects along the outline of the conjunct area (step S162), and the power distribution display processing B is finished. For example, the curved-line objects are set like curved-lines drawn with a red pen.

Subsequently, in FIG. 15A, the image generation unit 24 generates as a game image, an image obtained by viewing the virtual space from a given virtual camera (step S148), and the image display unit 30 displays the generated game image (step S150). Subsequently, if the replay is finished (step S152; YES), the game operating unit 22 finishes the display of the replay.

Through the above processing, the power distribution can be displayed on the pitch Fp during the replay is displayed. By viewing this, the game playing person can analyze his/her own play.

Figure 17:
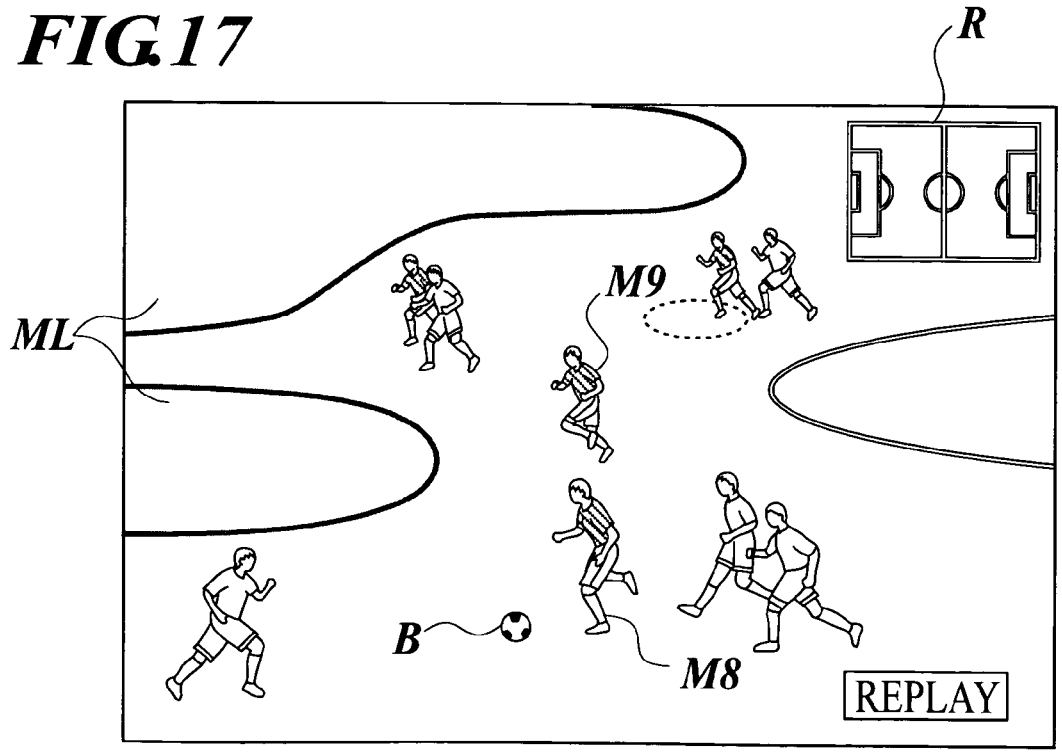
FIG. 17 is a diagram showing an example of the soccer game screen on which a power distribution is output during the replay.

FIG. 17 is a diagram showing an example of the screen on which the power distribution is output during the replay in the present embodiment, and shows the same situation as FIG. 16. On the pitch Fp, curved-line objects ML are displayed, and thereby spaces are displayed on the screen as if a TV commentator gave an explanation on TV broadcasting of an actual soccer while drawing spaces on the video screen, and the game playing person can be given such a feeling as if an analysis were made while a replay is actually displayed with video images.

[Construction of Hardware]

Figure 18:
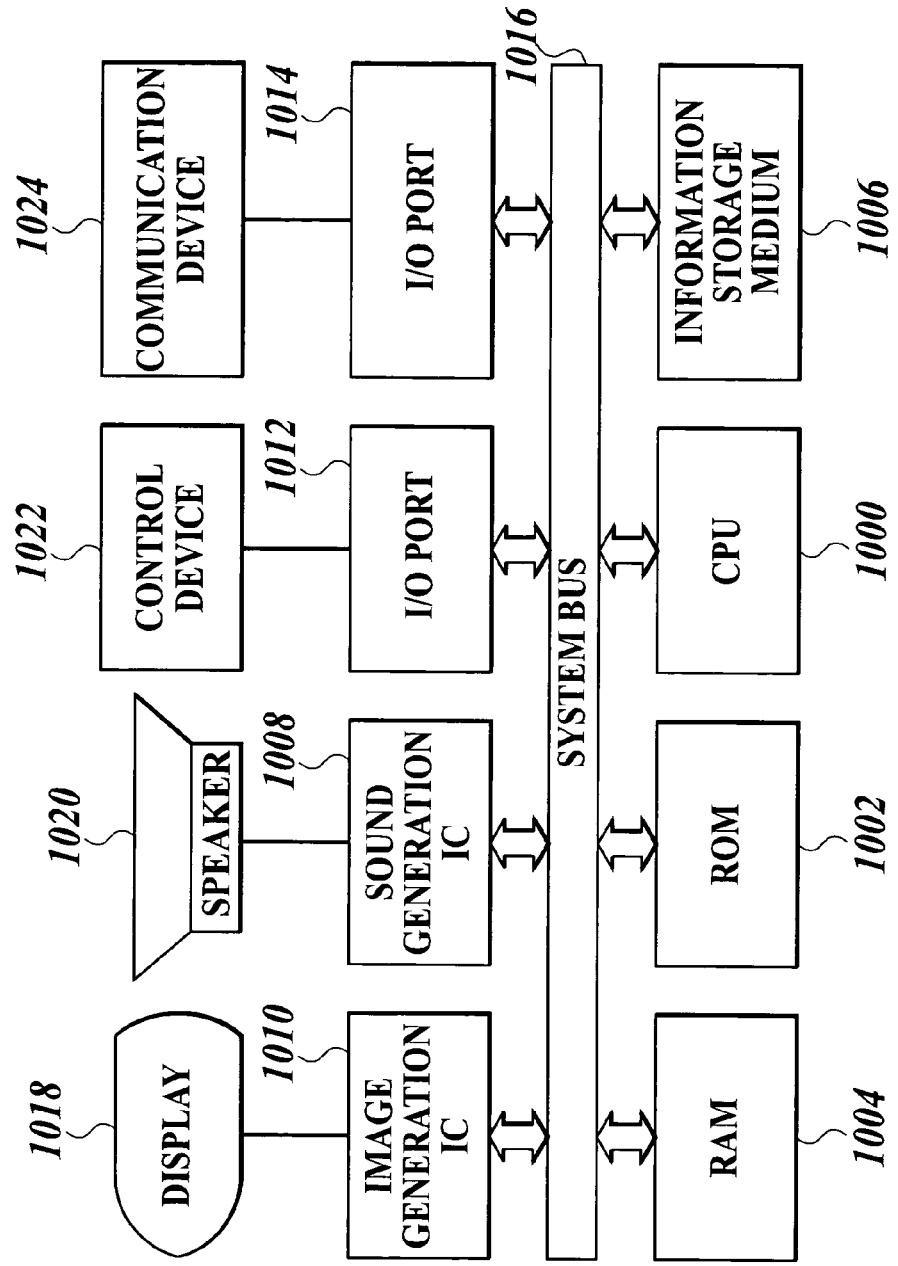
FIG. 18 is a diagram showing an example of the hardware construction to implement home game device to which the present invention is applied.

Next, the construction of hardware which can implement the home game device 1200 will be described. FIG. 18 is a diagram showing an example of the hardware construction according to the present embodiment. The home game device 1200 comprises CPU 1000, ROM 1002, RAM 1004, an information storage medium 1006, a sound generation IC 1008, an image generation IC 1010, and I/O ports 1012 and 1014, and these elements are connected to one another so that data can be mutually input/output to/from one another through a system bus 1016.

CPU 1000 corresponds to the processing unit 20 of FIG. 8, and carries out the control of all the devices and various processing according to the programs stored in the information storage medium 1006, the system program stored in ROM 1002, the operation input signals input from the control device 1022, etc.

ROM 1002, RAM 1004 and the information storage medium 1006 correspond to the storage unit 70 of FIG. 8. ROM 1002 corresponds to the IC memory mounted in the main body device 1210, and stores the programs and data associated with the control of the main body device 1210 such as the system program, etc.

RAM 1004 is a storing means used as a working area of CPU 1000, and stores given contents of the information storage medium 1006 and ROM 1002 or the operation result of CPU 1000.

The information storage medium 1006 corresponds to CD-ROM 1212, the IC memory 1214 or the memory card 1216 of FIG. 1, and stores the game information 72 of FIG. 8. The information storage medium 1006 stores and the information stored in ROM 1002 which is implemented by an IC memory card, a detachable hard disc unit, MO or the like and suitably reads out them for use.

The sound generation IC 1008 is an integrated circuit for generating game sounds such as effective sounds, BGM, etc. on the basis of the information stored in ROM 1002 or the information storage medium 1006, and the generated sounds are output from the speaker 1020. The speaker 1020 corresponds to the sound output unit 40 of FIG. 8 or the speaker 1222 of FIG. 1.

The image generation IC 1010 is an integrated circuit for generating pixel information to output an image to the display device 1018. The image generation unit 24 of FIG. 8 corresponds to the image generation IC 1010.

The display device 1018 corresponds to the image display unit 30 or corresponds to the display 1220 of FIG. 1.

The control device 1022 is connected to the I/O port 1012, and the communication device 1024 is connected to the I/O port 1014.

The control device 1022 corresponds to the operation input unit 10 of FIG. 8 and the game controller 1202 of FIG. 1, and it is a device for allowing the game playing person to input various game operations.

The communication device 1024 receives/transmits various kinds of information used in the game device from/to outside. It is connected to another game device and used to receive/transmit given information corresponding to a game program and receive/transmit information such as a game program, etc. through the communication line. It corresponds to the communication unit 50 of FIG. 8 and the communication device 1218 of FIG. 1.

The processing executed in the image generation IC 1010, the sound generation IC 1008, etc. may be executed with software by CPU 1000, general-purpose DSP or the like.

Furthermore, the present invention is applicable to not only the home game device 1200 shown in FIG. 1, but also an arcade game device, a portable game device, a general-purpose computer such as a personal computer or the like, and various kinds of large-scale attraction devices in which many players participate.

Figure 19:
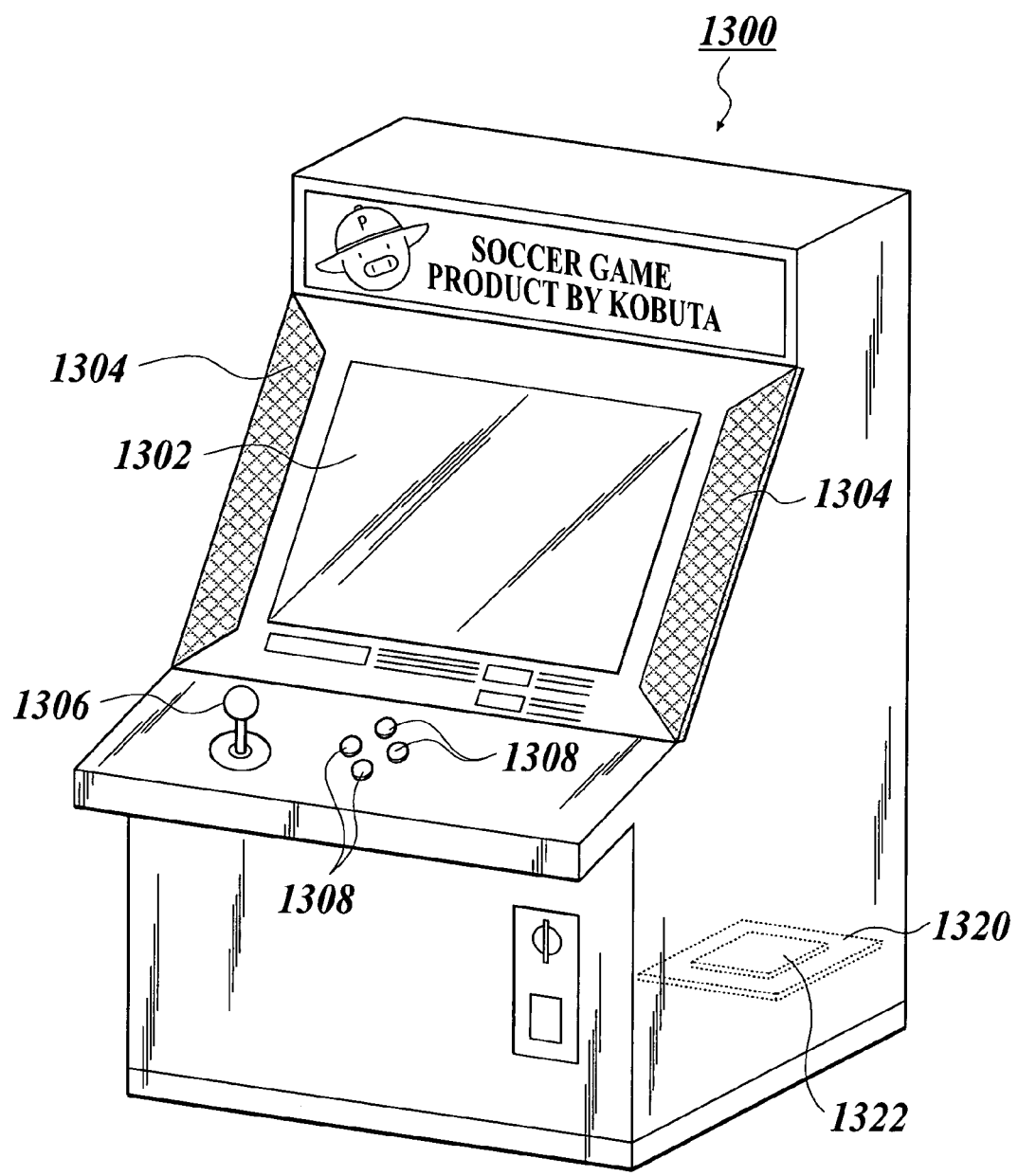
FIG. 19 is a diagram showing an example of the outline when the present invention is applied to a arcade game device.

For example, FIG. 19 shows an example of the outlook of an arcade game device 1300 to which the present invention is applied. As shown in FIG. 19, the arcade game device 1300 is equipped with a display 1302 for displaying images on the game screen, a speaker 1304 for outputting game effective sounds or BGM, a joy stick 1306 for inputting frontward, rearward, rightward and leftward directions, a push button 1308, and a control unit 1320 for integrally controlling the arcade game device 1300 through the operation processing to execute a given game.

In the control unit 1320 thereon mounts an operation processing device such as CPU or the like and ROM 1322 in which programs and data necessary to control the arcade game device 1300 and execute the game are stored. CPU mounted in the control unit 1320 suitably reads out the programs and data from ROM 1322 and carries out the operation processing to execute various kinds of processing.

The game playing person enjoys the game by inputting a game operation from the joy stick 1306 and the push buttons 1308 while viewing the game screen displayed on the display 1302.

Furthermore, the present invention is not limited to games executed by a stand-alone device, but also to the so-called network games. As the system construction implementing the network game, known are a construction in which a house hold personal computer, home game system or the like is used as a game terminal and it is connected to a server through a wired/wireless communication line such as an Internet network, an exclusive network or the like, a construction in which a plurality of terminals are connected to one another through a communication line without using server, a construction that a plurality of game terminals are connected to one another, but one of them has a server function, a construction that a plurality of game terminals are physically coupled to one another and they constitute a single system as a whole (for example, an arcade game system).

Second Embodiment

Next, a second embodiment to which the present invention is applied will be described with reference to FIGS. 20 to 24B. The present embodiment is basically implemented by the same constituent elements as the first embodiment. However, it is different from the first embodiment in that the power distribution is not output with image display, but output with sounds. The same constituent elements as the first embodiment are represented by the same reference numerals, and the description thereof is omitted.

[Description of Functional Block]

Figure 20:
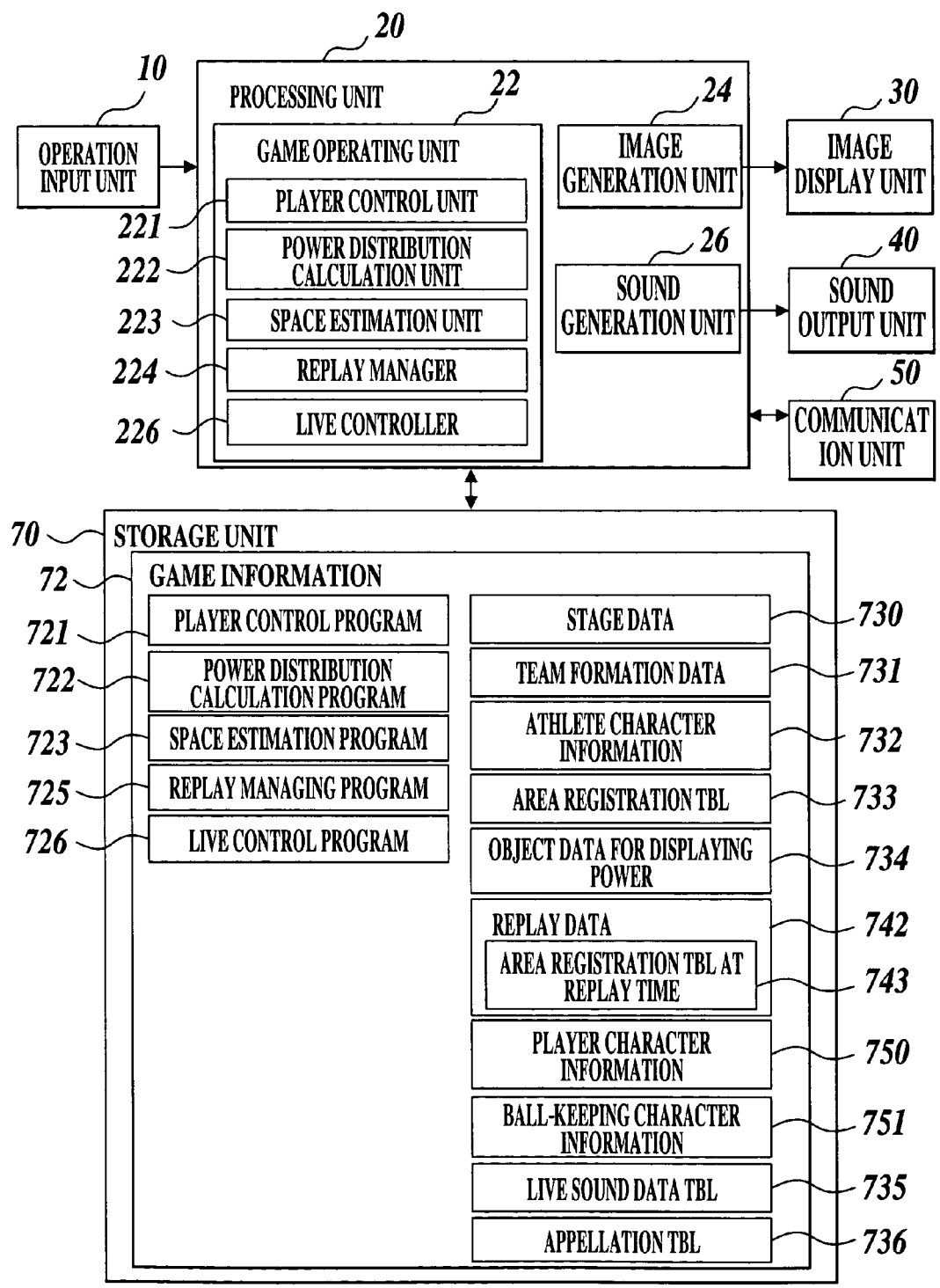
FIG. 20 is a functional block diagram showing an example of the functional construction according to a second embodiment.

FIG. 20 is a functional block diagram showing an example of the functional construction according to the present embodiment. As shown in FIG. 20, the home game device 1200 according to the present embodiment contains a live controller 226 for controlling the output of live sounds to the processing unit 20. The live sounds correspond to audio data imitating the voices of an announcer or a commentator who broadcasts on the spot or gives a running account like TV broadcast or radio broadcast voices, and the play-by-play controller 226 outputs voices during the progression of the game, whereby the game playing person can enjoy such a feeling as if he/she played a game under TV broadcast or radio broadcast.

The storage unit 70 stores a live control program 726 for making the processing unit 20 function as the play-by-play controller 226, a live audio data TBL 735 in which live audio data which is in advance created under the assumption of game conditions are stored, and an appellation TBL 736 in which the appellations of the sites of the pitch Fp are stored.

Figures 21, 22A, 22B:
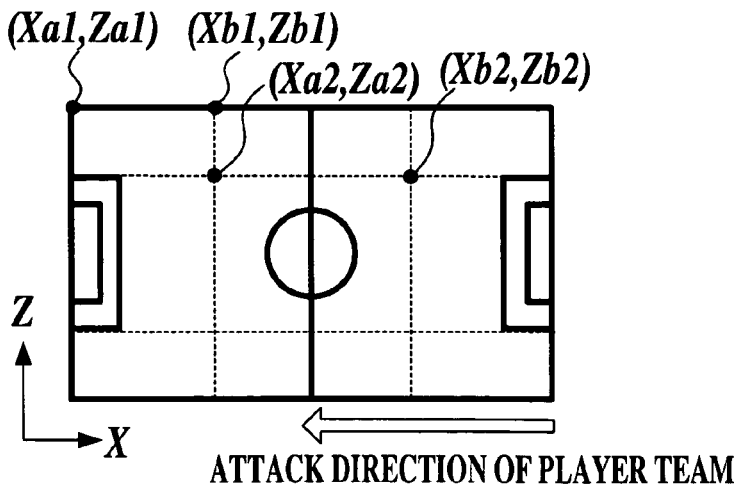
FIG. 21 is a diagram showing an example of a live sound data TBL.
FIGS. 22A and 22B are diagrams showing an example of appellation TBL.

FIG. 21 is a diagram showing an example of the live audio data TBL 735 according to the present embodiment. The live audio data TBL 735 stores each live audio data 735$b$ and a selection condition 735$a$ for selecting the live audio data 735$b$ in association with each other. The audio data of the appellation at a site of the pitch Fp in which a space exists is inserted at the portion corresponding to "APPELLATION" in FIG. 21.

FIGS. 22A and 22B are diagrams showing an example of the appellation TBL 736 according to the present embodiment. Each coordinate range 736$a$ and the appellation sound data 736$b$ of the coordinate range are stored in association with each other in the appellation TBL 736 as shown in FIG. 22A. The ranges discriminated by the coordinate ranges 736$a$ are divided into three ranges in the short-side direction of the pitch Fp so as to correspond to generally called "front (or forward, front field)", "half (or middle, mid field)" and "back (or back field)" with respect to the team under attack as shown in FIG. 22B and further correspond to generally called "right side", "center" and "left side" toward the goal. Each coordinate range stores the coordinate values of an upper and right side and a upper left side of each rectangular range.

[Description of Processing Flow]

Next, the flow of the processing according to the present embodiment will be described. The flow of the overall processing from the start of the game to the end-game is the same as the first embodiment. However, the present embodiment is different in that the power distribution sound output processing is executed instead of the power distribution display processing A.

Figure 23:
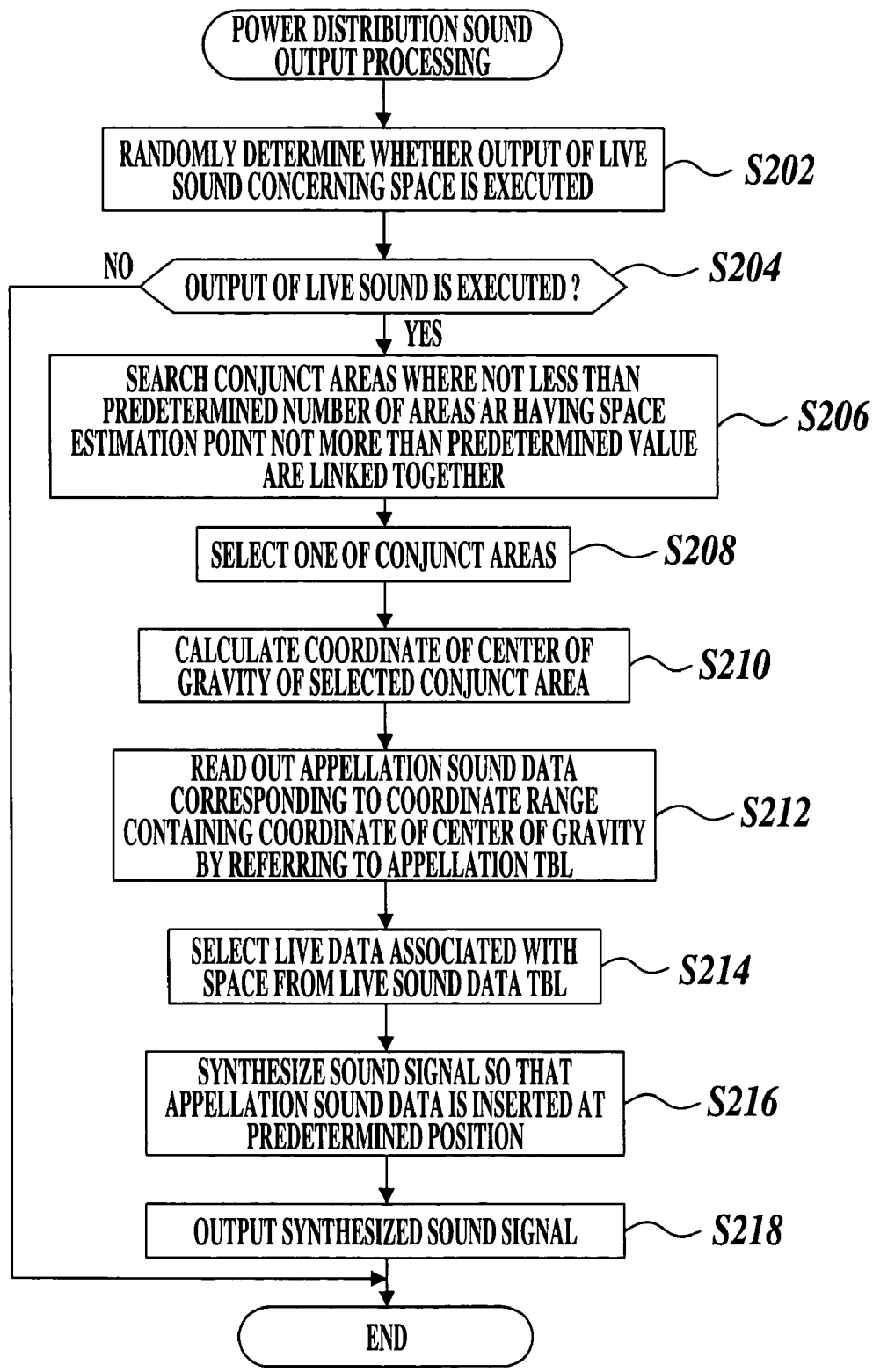
FIG. 23 is a flowchart showing the flow of power distribution sound output processing according to the second embodiment.

FIG. 23 is a flowchart showing the flow of the power distribution sound output processing according to the present embodiment. In order to implement the processing described below, the processing unit 20 reads out and executes the play-to-play control program 726.

As shown in FIG. 23, first, it is randomly determined in the power distribution sound output processing whether the play-to-play controller 226 executes the output of a live voice concerning a space (step S202).

When the output of the live voice concerning the space is executed (step S204; YES), there are searched conjunct areas in which not less than predetermined number of areas AR each having a space estimation point 733$f$ of not more than a predetermined value, that is, areas AR judged as spaces are conjunct to one another (step S206), and then one conjunct area is selected among the searched conjunct areas (step S208).

Subsequently, the coordinate of the center-of-gravity of the selected conjunct area is calculated (step S210). Specifically, the coordinate values of the representative points Q of the AR areas regarded as constituting the selected conjunct area are referred to in the area registration TBL 733, the average value of the coordinate values of the representative points Q is calculated, and it is set as the value of the center-of-gravity coordinate of the conjunct area.

Subsequently, with the coordinate ranges 736$a$ of the appellation TBL 736 referred to, the appellation audio data 736$b$ corresponding to the range containing the center-of-gravity coordinate of the selected conjunct area is read out (step S212), and the live audio data 735$b$ concerning the space is randomly selected from the live audio data TBL 735 (step S214).

Subsequently, the sound generation unit 26 synthesizes a sound signal so that the appellation audio data 736$b$ previously read out is inserted into a predetermined position of the randomly-selected live audio data 735$b$ (step S216), and outputs the synthesized sound signal by the sound output unit 40 (step S216).

Figure 24A:
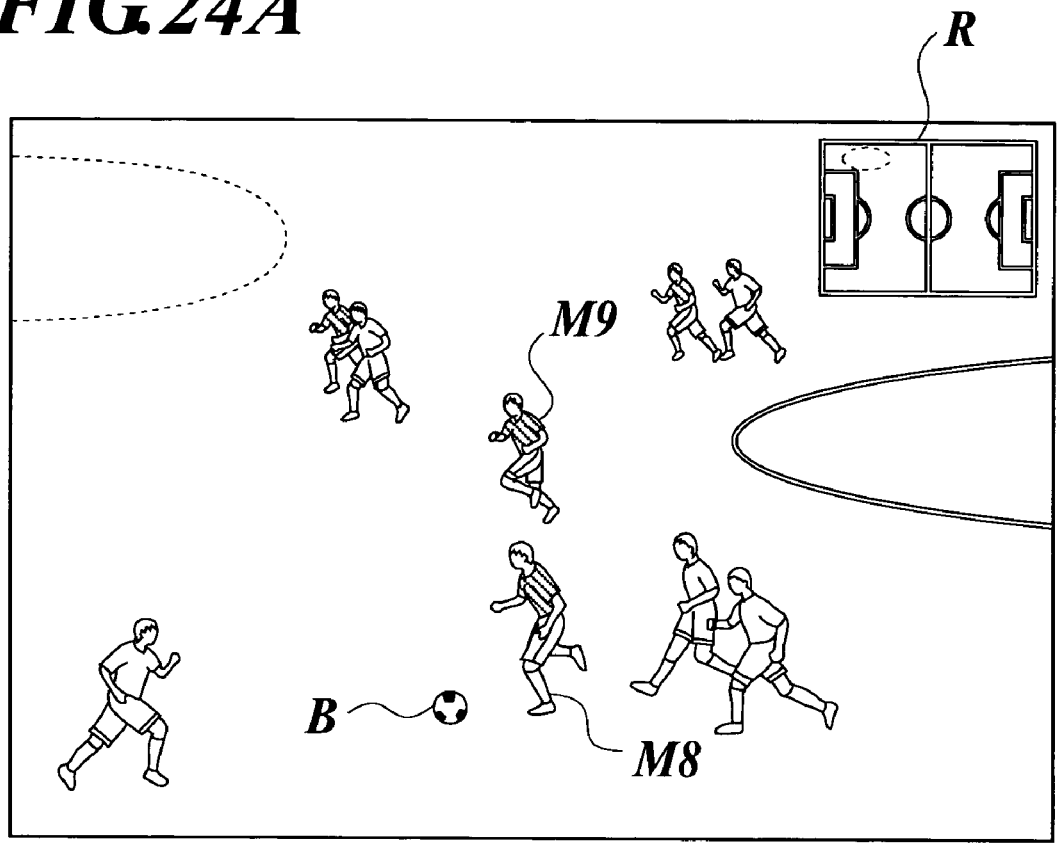
FIGS. 24A and 24B are diagrams showing an example of the power distribution output according to the second embodiment.
Figure 24B:

FIGS. 24A and 24B are diagrams showing an example of the power distribution output according to the present embodiment. As shown in FIG. 24A, the display frame of the soccer game is displayed on the game screen in the same way as the prior art, and the predominant range displaying object Mp and the space displaying object Ms as shown in the first embodiment are not displayed on the screen. On the other hand, a live voice such as "Now, they better use (right front side) space!" is output from the speaker 1222 as shown in FIG. 24B. The game playing person listens to this live voice and understands that a space exists at the right front side (corresponding to a portion indicated by a broken line of FIG. 24A).

It is needless to say that the live sound is the voice of an announcer or the voice of the commentator. One conjunct area is selected from the conjunct areas, and the live sound is output for the conjunct area. However, the live sounds may be output for a plurality of conjunct areas. Furthermore, the output of the live sound concerning the space is randomly executed. However, the presence or absence of input of a predetermined operation may be judged in step S202 so that the input of the predetermined operation from the game controller 1202 is set as the condition as well as the first embodiment.

Furthermore, in step S208, weighting processing may be executed when the conjunct area is selected so that a conjunct area close to a player M keeping the ball B, a conjunct area contained in the field angle of the virtual camera or a conjunct area close to the rival-team goal may be selected.

Third Embodiment

Next, a third embodiment according to the present invention will be described. The present embodiment can be basically implemented by the same constituent elements as the first embodiment. However, it is different in that in the power distribution calculating method, with respect to all the areas AR in the pitch Fp, players M contained within the arrival time calculation range from the representative point Q of each area AR are selected, and the minimum arrival time T is determined among the arrival times T of the selected players M. The same constituent elements and functional blocks as the first embodiment are represented by the same reference numerals, and the description thereof is omitted.

Figure 25:
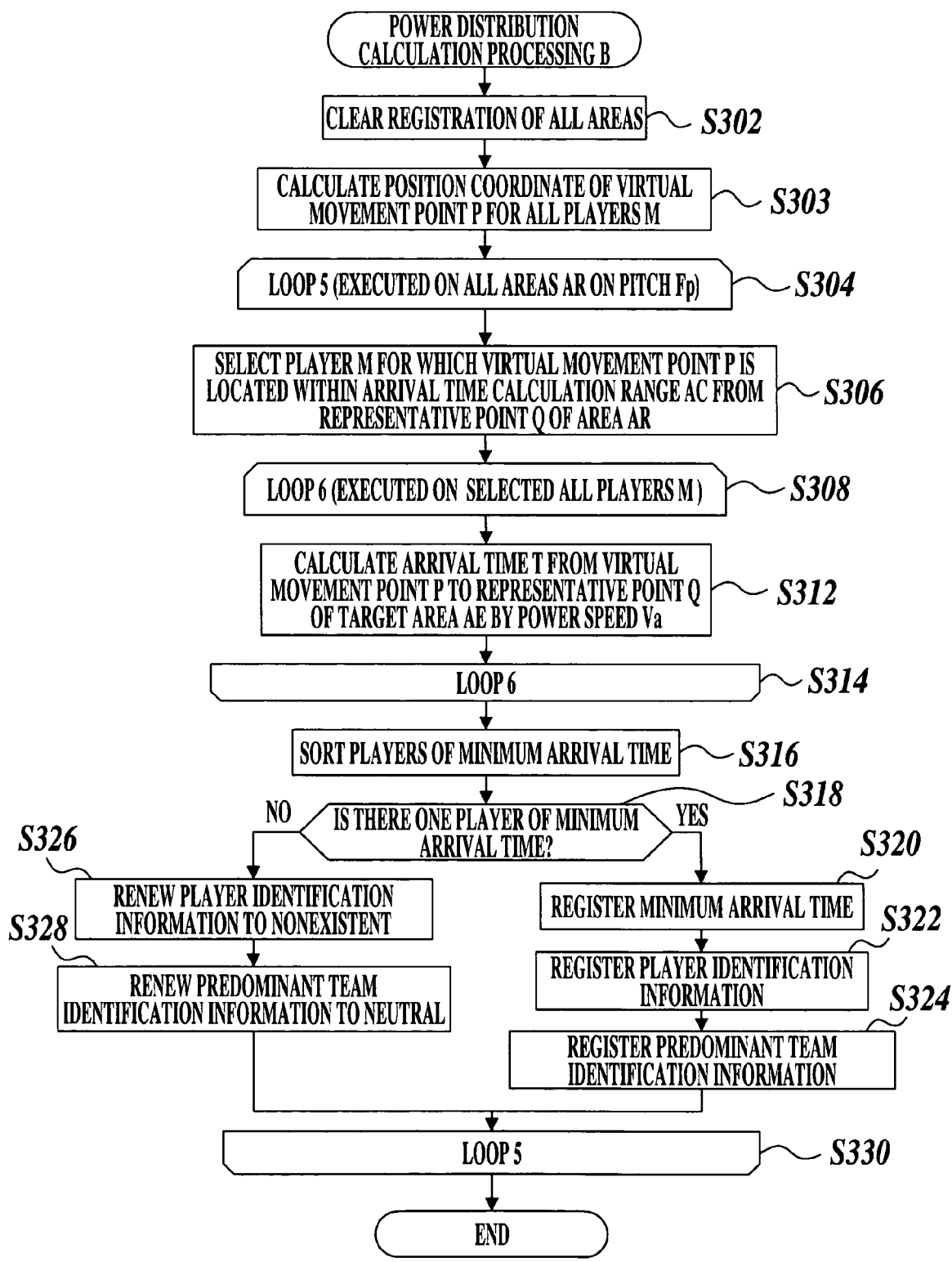
FIG. 25 is a flowchart showing the flow of the power distribution calculation processing according to a third embodiment.

FIG. 25 is a flowchart showing the flow of the power distribution calculation processing B according to the present embodiment. As shown in FIG. 25, the power distribution calculation unit 222 first initializes the minimum arrival time 733c, the player identification information 733d, the predominant team identification information 733e and the predominant team information 733 which are registered in the area registration TBL 733 to clear the registration of these information (step S302).

Subsequently, the position coordinate of the virtual moving point P is calculated for all the players M (step S303). Specifically, the position coordinate 732d and the speed 732e are referred to in the athlete character information 732, and the position coordinate of the virtual moving point at which the player M arrives after running from the current position at a speed Vn for 0.5 second is calculated. The position coordinate of the calculated virtual moving point P is temporarily stored in the storage unit 70, for example, so as to be related to the player identification information 732a.

Subsequently, the loop 5 (the processing of steps S304 to S330) is carried out on each area AR on the pitch F successively.

In the loop 5, a player M located within the arrival time calculation range AC with the representative point Q of an area AR to be processed at the center thereof is selected (step S306). Specifically, the representative point coordinate 733b of the area AR is referred to in the area registration TBL 733, and the distance from the representative point Q to the virtual moving point P of each player M is calculated and then the distance is converted into the actual distance at a predetermined rate. When the converted value is not more than 15 m of the arrival time calculation range AC, the corresponding player M is selected, and the player identification information 732a is temporarily stored in the storage unit 70.

If the players M contained in the arrival time calculation range AC are selected, the power distribution calculation unit 222 successively executes the loop 6 (the processing of steps S308 to S314) on each of the selected players M.

In the loop 6, the arrival time T of the player M to be processed from the virtual moving point P thereof to the representative Q of the area AR to be processed is calculated (step S312). Specifically, the distance from the virtual moving point P to the representative point Q is calculated, and multiplied by a predetermined ratio to be converted into an actual distance (for example, meters). The ability speed 732f is referred to in the athlete character information 732 of the player M, and the converted value is divided by the ability power Va to calculate the arrival time T. The calculated arrival time T is temporarily stored in the storage unit 70 so as to be related to the player identification information 732a. If the arrival time T is calculated for all the selected players M, the loop 6 is finished, and then the power distribution calculation unit 222 searches for a player M arriving at the area AR in the minimum arrival time T by sorting the calculated arrival times T (step S316).

As a result of the sort, when only one player M arrives in the minimum arrival time T (step S318; YES), the calculated and sorted minimum arrival time T is registered in the minimum arrival time 733c (step S320), and the player identification information 732a of the player M is registered in the player identification information 733d (step S322). Furthermore, the affiliated team identification information 732b of the player M is registered in the predominant team identification information 733e (step S324). Then, the loop 3 is finished.

When a plurality of players M arrive in the minimum arrival time T (step S318; NO), predetermined information indicating that there is no applicable player is registered in the player identification information 733d of the area AR (step S326), and predetermined information indicating neutrality is registered in the predominant team identification information 733e (step S328). Then, the loop 5 is finished, and the power distribution calculation processing according to the present embodiment is finished.

Through the above processing, information indicating which player's and which team's power range each area AR corresponds to is registered in the area registration TBL 733.

Fourth Embodiment

Next, a fourth embodiment to which the present invention is applied will be described with reference to FIGS. 26 to 29 by taking a case where a strategy simulation game is executed at a home game device. In the strategy simulation game, a game playing person's military (corresponding to the game playing person's team in the first to third embodiments) operated by a game playing person and a COM military (corresponding to the COM team in the first to third embodiments) operated by a computer battle against each other so that each team tries to reach the other team's stronghold as soon as possible while breaking through the other team's troops.

The present embodiment can be basically implemented by the same constituent elements as the first embodiment. The same constituent elements as the first embodiment are represented by the same reference numerals, and the description thereof is omitted.

Figures 26, 27:
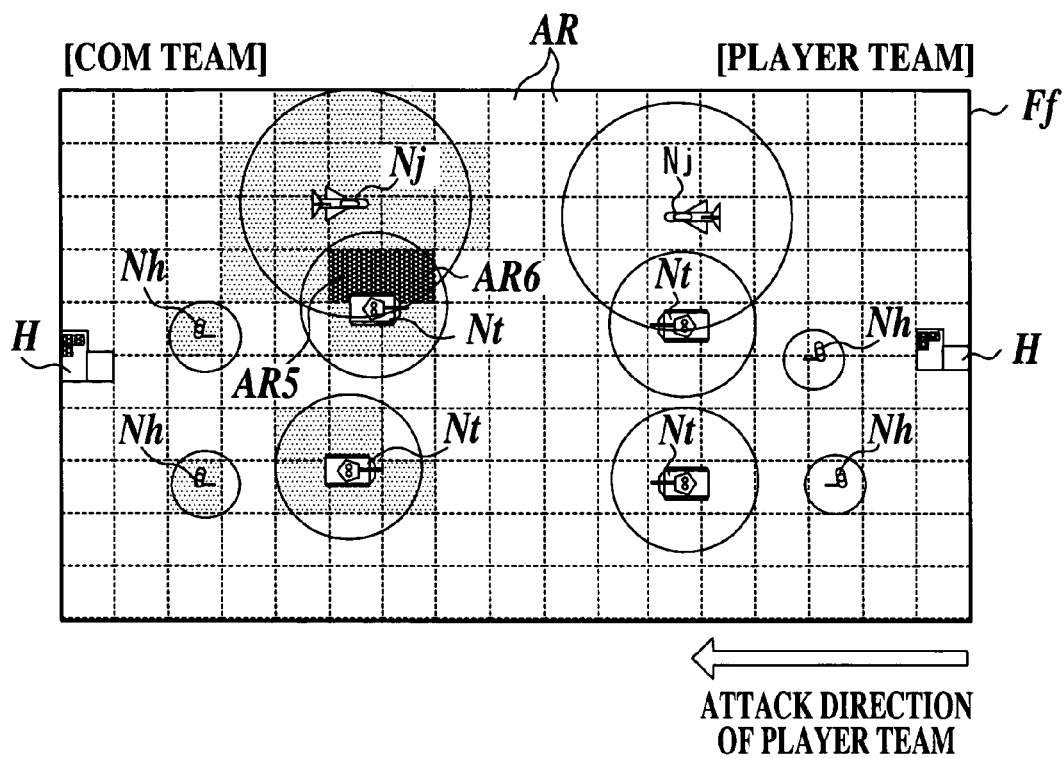
FIG. 26 is a diagram showing an example of a game screen according to a fourth embodiment.
FIG. 27 is a diagram showing an example of an area registration TBL according to the fourth embodiment.

FIG. 26 is a diagram showing an example of the game screen according to the present embodiment. Objects such as combat vehicles Nt, fighter planes Nj, foot soldiers Nh and strongholds H, each belong to either the game playing person's military or the COM military are arranged in a battle-field area Ff of an object space. Circles appending to the combat vehicles Nt, the fighter planes Nj and the foot soldiers Nh schematically represent the power ranges thereof.

The objects of the combat vehicles Nt, the fighter planes Nj and the foot soldiers Nh correspond to the players M of the first embodiment (hereinafter, these objects will be referred to as "troop unit N"). The battle-field area Ff corresponds to the pitch Fp of the first embodiment, and areas AR are likewise set in the battle-field area Ff.

Predominant range displaying objects Mp are displayed to be arranged on the upper surfaces of meshed areas AR of the areas AR. In the present embodiment, the power distribution is displayed in a display mode matched with the overlap degree of power ranges of the respective troop units N. For example, in the case of FIG. 26, the overlap areas AR-5 and AR-6 between the power range of an enemy combat vehicle Nt and the power range of an enemy fighter plane Nj are displayed in a display mode different from that of the other areas Area which the power ranges are not overlapped (for example, different display color or display brightness).

That is, it is shown that this area is an area where the power is concentrated and the attack force and the defense force are high because there is a probability that both of the enemy combat vehicle Nt and the enemy flight plane advance to the areas AR-5 and AR-6. Upon viewing this situation, the game playing person can recognize it a good idea to advance his/her military troops with avoiding the areas AR-5 and AR-6 or to vanquish some of enemy combat vehicles Nt and fighter planes Nj associated with the areas AR-5 and AR-6 and then advance his/her military troops to these areas.

FIG. 27 is a diagram showing an example of the area registration TBL 737 according to the present embodiment. The area registration TBL 737 substitutes to the area registration TBL 733 according to the present embodiment. As shown in FIG. 27, a player power point 737g and a COM power point 737h are stored so as to be related to the area identification information 733a in the area registration TBL 737 according to the present embodiment. The player power point 737g and the COM power point 737h are initialized by storing "0" thereto, and a point is added to each of the player power point 737g and the COM power point 737h at each time that it is judged that the area AR is contained in the power range of a troop unit N belonging to each of them. That is, a higher value is stored in the player power point 737g and the COM power point 737h as the overlap between the power ranges of the troop units N is intensified.

Figure 28:
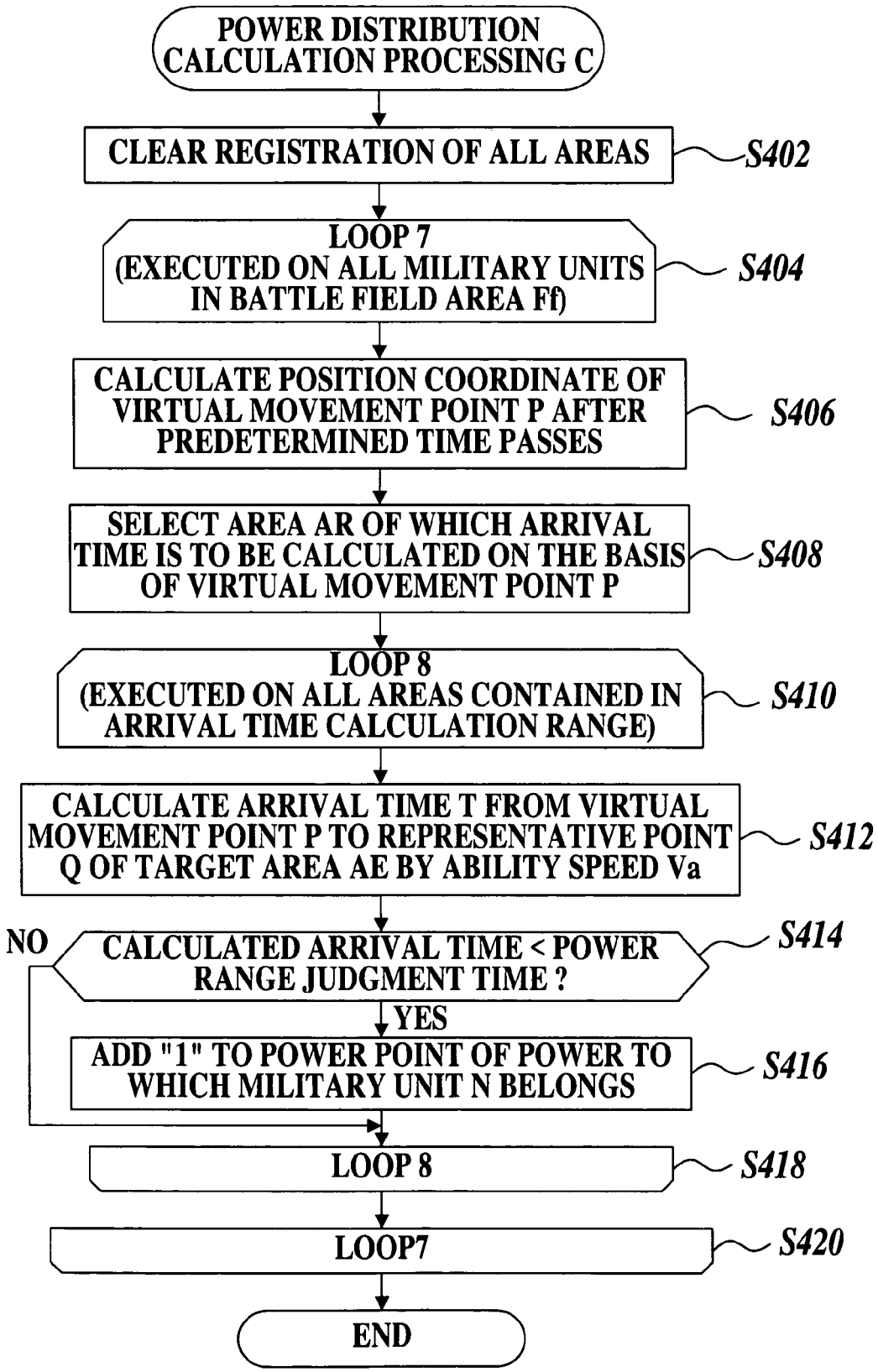
FIG. 28 is a diagram showing the flow of the power distribution calculation processing C according to the fourth embodiment.

FIG. 28 is a flowchart showing the flow of the power distribution calculation processing C according to the present embodiment. The power distribution calculation processing C is defined as a substitution of the power distribution calculation processing A of the first embodiment in the power distribution calculation program 724, and executed by the power distribution calculation unit 222.

As shown in FIG. 28, the power distribution calculation unit 222 first initializes the player power point 737g and the COM power point 737h registered in the area registration TBL 737 by storing "0" into these power points 737g and 737h to clear the registration (step S402).

Subsequently, the loop 7 (the processing of steps S404 to 420) is executed for all the troop units N on the battle-field area Ff.

In the loop 7, the position coordinate of the virtual moving point P after a predetermined time has passed under the state that a troop unit N to be processed keeps the current speed Vn is calculated (step S406), and areas AR contained within the arrival time calculation range AR from the virtual moving point P are selected among the areas AR of the battle-field area Ff (step S408).

Subsequently, the power distribution calculation unit 222 successively executes the loop 8 (steps S410 to S418) for each of the areas AR contained within the arrival time calculation range AC.

In the loop 8, the arrival time T of the troop unit N from the virtual moving point P to the representative point Q of the area AR to be processed is calculated (step S412). If the calculated arrival time T is smaller than a predetermined power range judgment time TS (step S414; YES), that is, if the area is judged as the power range of the troop unit N, "1" is added to the power point of the power to which the troop N belongs (the player power point 737g or the COM power point 737h) (step S416).

As described above, the overlap degree of the power ranges of the troop N in each area AR is registered in the area registration TBL 737.

Figure 29:
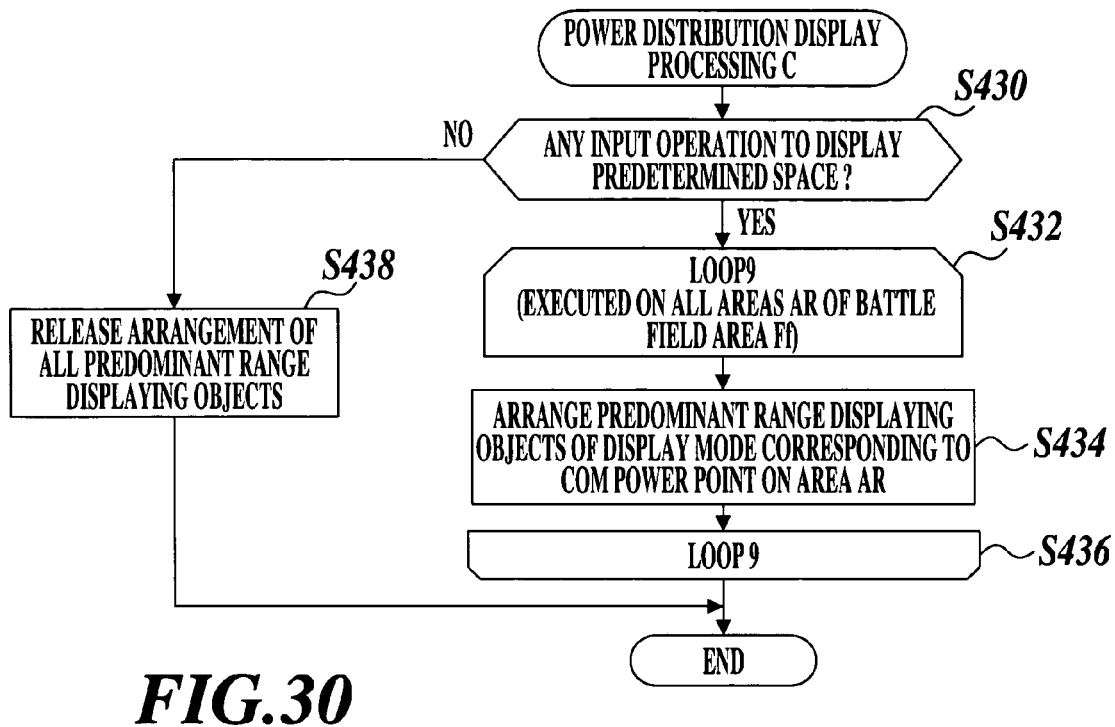
FIG. 29 is a flowchart showing the flow of the power distribution calculation processing C according to the fourth embodiment.

FIG. 29 is a flowchart showing the flow of the power distribution display processing C according to the present embodiment. The power distribution display processing C is defined as a substitution of the power distribution displaying processing A of the first embodiment by the power distribution display program 725, and it is executed by the power distribution display controller 224.

As shown in FIG. 29, the power distribution display controller 224 first judges whether a predetermined operation input for outputting a power distribution is made from the operation input unit 10 (step S430). If the operation for displaying the power distribution is input (step S430; YES), the loop 9 (the processing of steps S432 to S436) is successively executed on each area AR of the battle-field area Ff.

That is, a predominant range displaying object Mp having a predetermined display mode which corresponds to the value of the COM power point 737h corresponding to the area AR to be processed is disposed on the upper surface of the area AR (step S434). The predominant range displaying object Mp corresponding to the value of the power point may be set so that the power point of "0" corresponds to a colorless object, "1" corresponds to an object displayed as being translucent yellow, "2" corresponds to an object displayed as translucent light-blue, and "3" corresponds to an object displayed as being translucent red.

Accordingly, through the power distribution display processing C, the power distribution can be displayed in the object space in a display mode which is different in accordance with the overlap degree of the power ranges of the enemy power.

The predominant range displaying object Mp may be displayed in accordance with the value of the player power point 737g as well as the predominant range displaying object Mp is displayed in accordance with the value of the COM power point 737h, whereby the game playing person can check the arrangement of his/her military.

[Description of Modification]

The first to fourth embodiments to which the present invention is applied have been described above. However, the present invention is not limited to these embodiments, and addition/deletion/alteration may be properly made without departing from the gist of the present invention.

For example, the type of the applicable game is not limited to the soccer and the strategy simulation, and the present invention may be applied to other games in which a plurality of characters move in a predetermined field, for example a sport game such as volleyball, hockey, basketball, snowball fight or the like, a roll play game having a battle system of a type of strategy simulation, etc.

Figure 30:
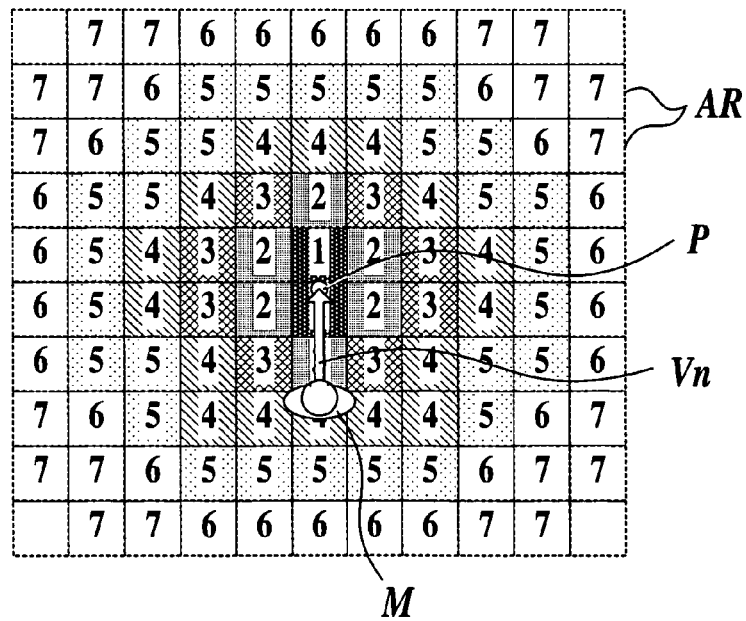
FIG. 30 is a diagram showing a modification of the display of a predominant range.

Furthermore, the display of the predominant range is not limited to the monochromatic uniform display mode as shown in the first embodiment, and it may be carried out as shown in FIG. 30 for example, where the display color or degree of transparency is varied so that the display color is thicker as the minimum arrival time 733c is smaller when the predominant range displaying objects MP are arranged in the object space in step S110 (see FIG. 14).

Still furthermore, when predominant ranges or spaces are displayed, objects are separately arranged. However, the present invention is not limited to such an embodiment. For example, the pitch Fp may be constructed by polygons sectioned by the areas AR, and the display mode of the polygons may be set so that the predominant ranges and spaces are displayed by changing the color, the pattern, the textures to be attached. In this case, the display modes of the polygons of the objects are changed in the steps S106 and S110 of the power distribution display processing A (see FIG. 14), and the display modes of the polygons in step S112 and S114 are returned to the standard state to thereby set the predominant ranges and the spaces to non-display.

Figure 31:
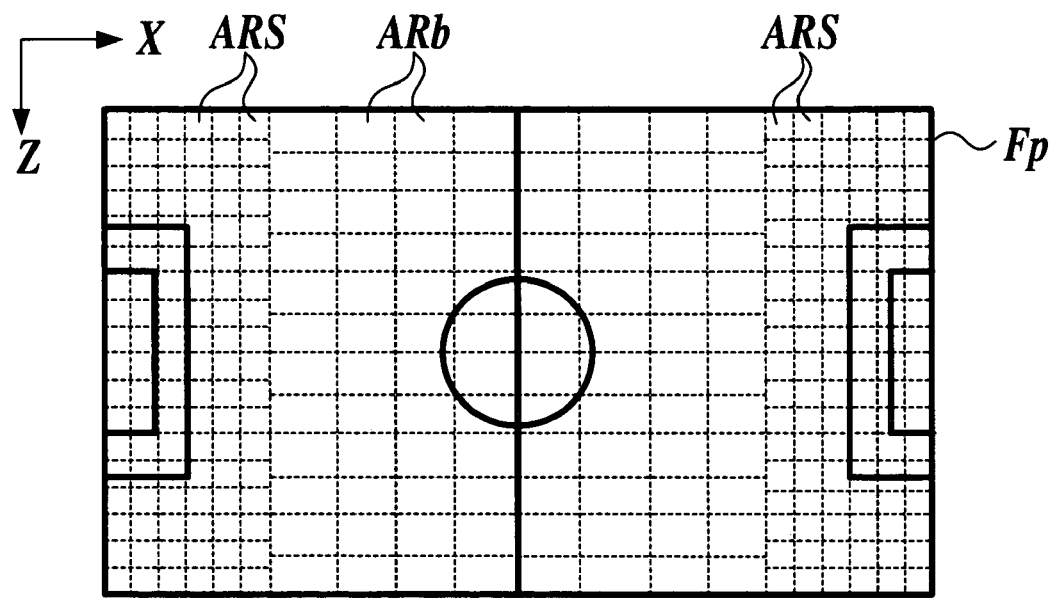
FIG. 31 is a diagram showing a modification of the setting of an area AR.

Still furthermore, the areas AR are set to the pitch Fp so that the size and arrangement thereof are set uniformly. However, the present invention is not limited to such an embodiment. For example, it may be modified so that detailed areas ARs are set in front of the goals and large-scale areas ARb each of which is larger in area than the detailed area ARs are set in the vicinity of the center portion of the pitch Fp as shown in FIG. 31. In this case, the power distribution around the goal at which players M are likely in a concentrated formation can be calculated and displayed in more detail. Furthermore, the shape thereof is not limited to a rectangle, and it may be other shapes such as a triangular shape, a hexagonal shape, an elliptic shape, etc.

The entire disclosure of Japanese Patent Application No. Tokugan 2003-122769 filed on Apr. 25, 2003 including specification, claims, drawings and summary are incorporated herein by reference in its entirety.

What is claimed is:

1. A game executing method for making a computer device execute a given game by generating an image of a game space, and for analyzing and outputting a power distribution of a character group in the game space, the character group comprising a plurality of characters movable in the game space,
   wherein the character group includes a plurality of character group,
   the method comprising:
   setting a plurality of sample points in the game space;
   calculating a time needed for each of the plurality of characters to arrive at each of the set plurality of sample points respectively from a position of each of the plurality of characters at a time after each of the plurality of characters has maintained a current moving condition for a predetermined time period as a starting point;
   calculating the power distribution of each of the plurality of character groups based on the calculated time of each of the plurality of characters to each of the plurality of sample points; and
   outputting, through display and/or voice, an area which is not a power area of any of the plurality of character groups in the game space as a space area, based on the calculated power distribution of each of the plurality of character groups.

2. The method as claimed in claim 1, wherein the calculating the time includes calculating the arrival time from the starting point to each of the set plurality of sample points based on a movement ability value preset to each of the plurality of characters.

3. The method as claimed in claim 1, further comprising selecting a sample point positioned within power permissive distance from the starting point, among the set plurality of sample points,
   wherein calculating the arrival time includes calculating the arrival time of each of the plurality of characters from the starting point to the selected sample point.

4. The method as claimed in claim 1, further comprising selecting a character of which the arrival time is to be calculated based on the distance from each of the plurality of set sample points to the starting point,
   wherein calculating the arrival time includes calculating a time needed for the selected character to arrive at each of the plurality of set sample points.

5. The method as claimed in claim 1, further comprising:
   calculating a predominance degree for each of the plurality of set plurality of sample points; and
   calculating the predominance degree of each of the plurality of sample points so as to make the predominance degree higher as the arrival time of a character is shorter,
   wherein calculating the power distribution includes calculating the power distribution based on the calculated predominance degree of each of the plurality of sample points.

6. The method as claimed in claim 1, wherein the setting the plurality of sample points includes setting the plurality of sample points at a interval in the game space.

7. The method as claimed in claim 6, wherein the setting the plurality of sample points includes sectioning the game space into at least two kinds of a plurality of areas that are different from each other in shape and/or size, and setting the plurality of sample points in the plurality of sectioned areas.

8. The method as claimed in claim 1, wherein the calculating the power distribution includes calculating the power distribution for each of the plurality of character groups in accordance with the character group to which a character belongs, and with the characters' arrival times to each of the plurality of sample points.

9. The method as claimed in claim 1, further comprising:
   storing the calculated power distribution; and
   outputting the stored power distribution, through display and/or voice.

10. The method as claimed in claim 9, wherein the storing the calculated power distribution includes judging whether the calculated power distribution satisfies a storing condition, and storing the calculated power distribution if the power calculated distribution satisfies the storing condition.

11. The method as claimed in claim 1, wherein
    the plurality of characters include a plurality of characters moving on a terrain,
    the setting the plurality of sample points includes setting the plurality of sample points on the terrain,
    the calculating the power distribution includes calculating the power distribution on the terrain, and
    the outputting the space area includes identifiably displaying a portion of the space area on the terrain.

12. A game device for executing a game by generating an image of a game space, and for analyzing and outputting a power distribution of a character group in the game space, the character group comprising a plurality of characters movable in the game space,
    wherein the character group includes a plurality of character groups, the device comprising:
    a point setting section for setting a plurality of sample points in the game space;
    an inertia calculating section for calculating a position of each of the plurality of characters at a time that each of the plurality of characters has maintained a current moving condition for a time period;
    an arrival time calculating section for calculating a time needed for each of the plurality of characters to arrive at each of the set plurality of sample points respectively from a position of each of the plurality of characters at a time after each of the plurality of characters has maintained a current moving condition for a predetermined time period as a starting point;
    a distribution calculating section for calculating the power distribution of each of the plurality of character groups based on the calculated arrival time of each of the plurality of characters to each of the set plurality of sample points; and an output section for outputting, through display and/or voice, an area which is not a power area of any of the plurality of character groups in the game space as a space area, based on the calculated power distribution of each of the plurality of character groups.

13. A computer-readable storage medium that contains a computer executable program that causes an operating device to receive a data signal embodied in a carrier wave, the data signal causing the operating device to perform a method comprising:

setting a plurality of sample points in a game space;

calculating a time needed for each of the plurality of characters to arrive at each of the set plurality of sample points respectively from a position of each of the plurality of characters at a time after each of the plurality of characters has maintained a current moving condition for a predetermined time period as a starting point;

calculating a power distribution of each of the plurality of character groups based on the calculated time of each of the plurality of characters to each of the plurality of sample points; and outputting, through display and/or voice, an area which is not a power area of any of the plurality of character groups in the game space as a space area, based on the calculated power distribution of each of the plurality of character groups.

14. A computer-readable storage medium that contains a computer executable program, when the program is loaded onto an operating device, the program makes the operating device execute a method comprising:

setting a plurality of sample points in a game space;

calculating a time needed for each of the plurality of characters to arrive at each of the set plurality of sample points respectively from a position of each of the plurality of characters at a time after each of the plurality of characters has maintained a current moving condition for a predetermined time period as a starting point;

calculating a power distribution of each of the plurality of character groups based on the calculated time of each of the plurality of characters to each of the plurality of sample points; and outputting, through display and/or voice, an area which is not a power area of any of the plurality of character groups in the game space as a space area, based on the calculated power distribution of each of the plurality of character groups.

* * * * *